(12) United States Patent
Law et al.

(10) Patent No.: US 7,009,709 B2
(45) Date of Patent: **\*Mar. 7, 2006**

(54) ACTIVE CONTROL OF TWO ORTHOGONAL POLARIZATIONS FOR HETERODYNE BEAM DELIVERY

(75) Inventors: Joanne Y. Law, Sunnyvale, CA (US); Kerry D. Bagwell, Campbell, CA (US); Eric S. Johnstone, Redwood City, CA (US); Elizabeth A. Nevis, Lake Oswego, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/099,760

(22) Filed: Apr. 5, 2005

(65) Prior Publication Data

US 2005/0185190 A1     Aug. 25, 2005

Related U.S. Application Data

(60) Division of application No. 10/728,559, filed on Dec. 5, 2003, now Pat. No. 6,961,130, which is a continuation-in-part of application No. 10/439,970, filed on May 15, 2003, now Pat. No. 6,961,129.

(51) Int. Cl.
*G01B 9/02* (2006.01)
(52) U.S. Cl. .................................................. 356/484
(58) Field of Classification Search ................ 356/484, 356/486, 487, 493, 485
See application file for complete search history.

(56) References Cited

U.S. PATENT DOCUMENTS

| 4,684,828 A | 8/1987 | Sommargren |
| 4,687,958 A | 8/1987 | Sommargren |
| 4,817,206 A | 3/1989 | Calvani et al. |

(Continued)

OTHER PUBLICATIONS

Campbell, James P., "Rotating-Waveplate Optical-Frequency Shifting in Lithium Niobate", IEEE Journal of Quantum Electronics, vol. QE-7, No. 9 (Sep. 1971) pp. 450-457.

*Primary Examiner*—Gregory J. Toatley, Jr.
*Assistant Examiner*—Michael A. Lyons

(57) ABSTRACT

A polarization control system includes a beam source that generates a first beam component containing light with a first polarization and a first frequency and a second beam component containing light with a second polarization and a second frequency. A polarization state modulator adjusts the polarizations of the components for transmission on a single optical fiber. A detector system measures polarizations of the components when output from the optical fiber and determines how to adjust the polarization state modulator in order to give the first and the second components the desired output polarization states. The beam source can be implemented using a Zeeman-split laser, a laser containing a birefringent element, a pair of phase-locked lasers, and/or a variety of configurations of electro-optic or acousto-optic crystals operated to create or enhance the frequency difference between the beam components.

25 Claims, 14 Drawing Sheets

U.S. PATENT DOCUMENTS

| | | |
|---|---|---|
| 4,960,319 A | 10/1990 | Dankowych |
| 5,091,912 A | 2/1992 | Bretenaker et al. |
| 5,412,474 A | 5/1995 | Reasenberg et al. |
| 5,416,628 A | 5/1995 | Betti et al. |
| 5,485,272 A | 1/1996 | Dirksen et al. |
| 5,586,133 A | 12/1996 | Sommargren |
| 5,862,164 A | 1/1999 | Hill |
| 5,970,077 A | 10/1999 | Hill |
| 6,052,186 A | 4/2000 | Tsai |
| 6,157,660 A | 12/2000 | Hill |
| 6,452,682 B1 | 9/2002 | Hill et al. |
| 2004/0227943 A1 * | 11/2004 | Law et al. .................. 356/364 |

* cited by examiner

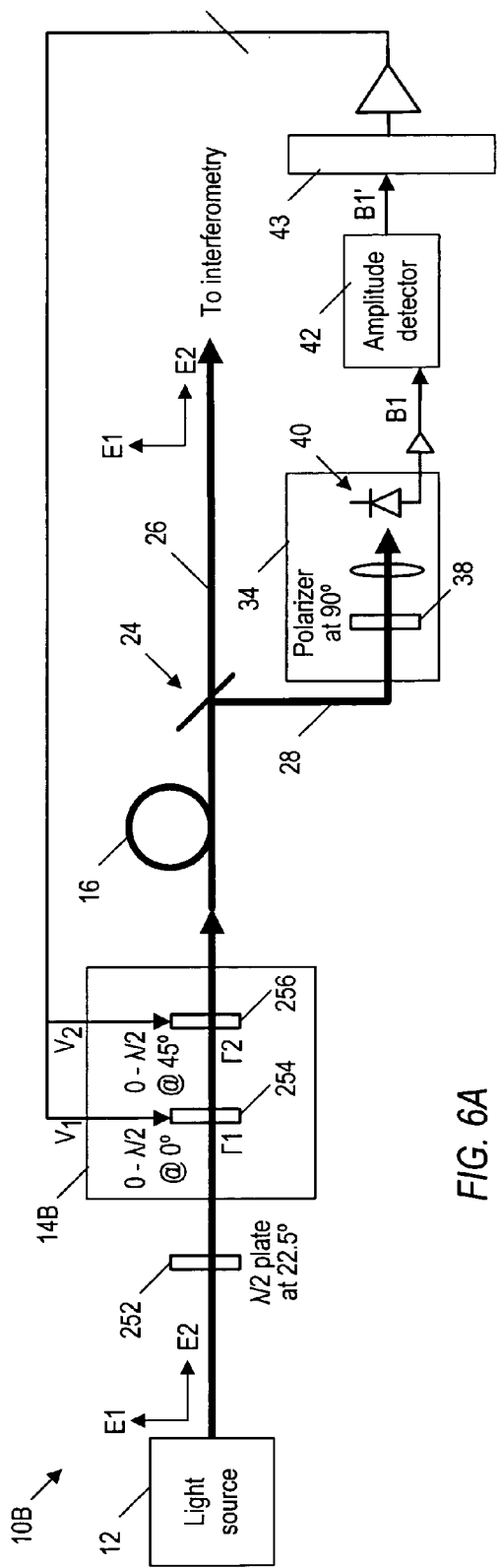
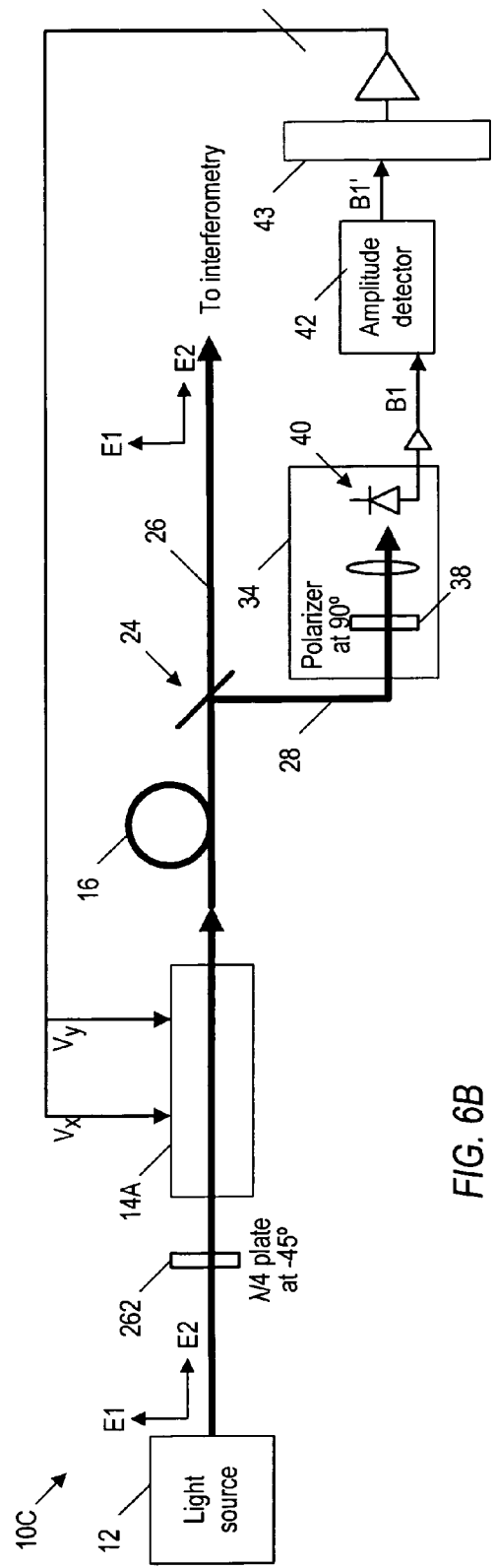
FIG. 6A
FIG. 6B

ACTIVE CONTROL OF TWO ORTHOGONAL POLARIZATIONS FOR HETERODYNE BEAM DELIVERY

CROSS-REFERENCE TO RELATED APPLICATIONS

This patent document is a divisional and claims the priority of U.S. patent application Ser. No. 10/728,559, filed Dec. 5, 2003, now U.S. Pat. No. 6,961,130 which is a continuation-in-part of U.S. patent application Ser. No. 10/439,970, filed May 15, 2003, now U.S. Pat. No. 6,961,129 both of which are hereby incorporated by reference in their entirety.

BACKGROUND

Measurement optics in a polarization based or multiplexed heterodyne interferometer such as used for precision measurements in semiconductor device manufacturing equipment generally require a light beam including orthogonal polarization components that have slightly different frequencies. However, the light sources such as lasers that generate the required beams also produce heat and temperature gradients that are generally unacceptable for precision operation of the interferometer measurement optics. Accordingly, the light sources generally must be separated from the measurement optics. Transmission of the polarization components on a single optical fiber is generally not used because even a polarization-maintaining (PM) fiber will typically change the polarizations too much for the precise measurements.

In one system for beam delivery, a beam splitter feeds one polarization component to a first PM fiber and feeds the second polarization component to a second PM fiber. The two separate fibers carry the two component beams to the interferometer optics near the measurement site. Polarizers, alignment optics, and a combiner can then recombine the two component beams so that the beams travel along a common path. Suitable alignment optics include, for example, collimators, flat transmissive windows, polarizing optics, beam splitters, and total and partial reflectors to translate and tilt the beams. The interferometer optics then reflect one of the component beams off of a stage being measured and reflect the other component off of a reference reflector. The phase difference between the two beams after respective reflections indicates the displacement or movement of the stage.

Conventional interferometer systems using two PM fibers for beam delivery often require sensitive alignment processes for the optics and combiner that recombine the two component beams. Additionally, having two fiber paths generally requires duplication of equipment or optical elements, which can increase system cost and size. Thus, a system that maintains the polarization of two light beams in a single fiber could reduce cost and complexity.

SUMMARY

In one embodiment of the invention, a polarization control system includes a beam source that generates two beam components with orthogonal polarizations and different frequencies. A polarization state modulator adjusts the polarization states of the two beam components for transmission on a single optical fiber. At the output from the fiber, a detector measures the output polarizations of the components. One such detector includes three detector paths that generate a first beat signal, a second signal, and a third signal from the two light beams. An amplitude detector determines the amplitude of the first beat signal at a beat frequency. A phase comparator determines the phase difference between the second and third signals. The system then uses the amplitude and the phase difference to determine how to adjust the polarization state modulator in order to give the first and the second light beams the desired polarizations when output from the fiber.

The beam source can be implemented using a Zeeman-split laser, a laser containing a birefringent element, a pair of phase-locked lasers, and/or a variety of configurations of electro-optic or acousto-optic crystals that are operated to create or enhance the frequency difference between the beam components.

BRIEF DESCRIPTION OF THE DRAWINGS

FIGS. 6A, 6B, 6C, and 6D illustrate polarization control systems for maintaining the polarization states of two orthogonal linearly-polarized light beams in embodiments of the invention.

DETAILED DESCRIPTION

In accordance with an aspect of the invention, a beam delivery system for a heterodyne interferometer uses a single fiber for delivery of a heterodyne beam containing frequency components with orthogonal linear polarizations. To deliver frequency components having the required orientations, the beam delivery system measures the magnitude and phase of a beat frequency in a polarization component and actively adjusts the polarizations of the beams input to the fiber to minimize the magnitude of the beat signal.

Figure 1:
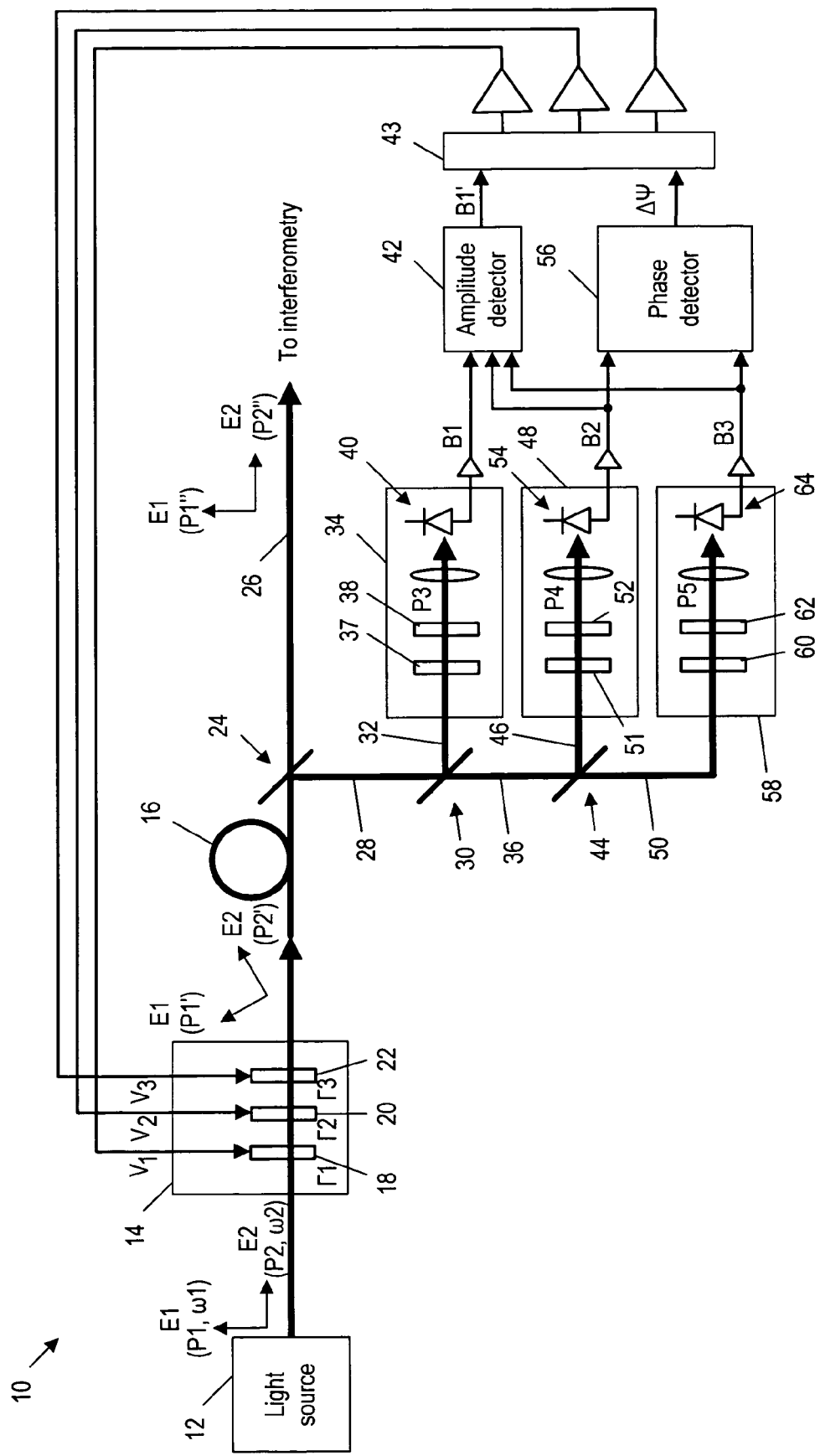
FIG. 1 illustrates a polarization control system in one embodiment of the invention for maintaining the polarized states of two orthogonally-polarized light beams.

FIG. 1 illustrates a polarization control system 10 in one embodiment of the invention. System 10 is implemented in a remote operation configuration where a polarization state modulator 14 is located upstream from an optical fiber 16 that feeds an interferometer system.

A polarization state modulator (PSM) generally converts an input polarization state into an output polarization state. One or more external inputs applied to the PSM controls the polarization conversion, and in general, the output polarization state differs from the input polarization state. For example, PSM 14 may consist of multiple variable retarders. A retarder (or waveplate) is an optical device that resolves a light wave into two orthogonal polarization components and produces a phase shift (or retardance) between them. The resulting light wave is generally of a different polarization form. Ideally, retarders simply change the polarization form of a light beam without polarizing or inducing an intensity change in the light beam. A variable retarder has a retardance that can be changed by external means, e.g., by the application of a voltage.

In system 10, a beam source 12 generates (1) a light beam E1 with a polarization state P1 and a frequency $\omega 1$ and (2) a light E2 with a polarization state P2 and a frequency $\omega 2$. In one embodiment, beam source 12 includes a Helium Neon (HeNe) laser and electro-optical components required to generate the desired polarizations and frequencies. For example, beam source 12 can be a 5517D laser made by Agilent Technologies. PSM 14 receives light beams E1 and E2 and adjusts initial polarization states P1 and P2 to polarization states P1' and P2', respectively, before launching light beams E1 and E2 into fiber 16. PSM 14 is operable to change any input polarization state P1 or P2 to any desired output polarization state P1' or P2'. In one embodiment, PSM 14 includes a voltage-controlled variable retarder 18 oriented at 0°, a voltage-controlled variable retarder 20 oriented at 45°, and a voltage-controlled variable retarder 22 oriented at 0°. Voltages V1, V2, and V3 control respective retarders 18, 20, and 22 to generate respective retardances $\Gamma 1$, $\Gamma 2$, and $\Gamma 3$.

Fiber 16 carries light beams E1 and E2 downstream to interferometer optics at a measurement site. In one embodiment, fiber 16 is a polarization-maintaining (PM) fiber. Experiments show that fiber 16 changes the polarization states P1' and P2' of light beams E1 and E2 to polarization states P1" and P2", respectively, that generally depend on the temperature and mechanical deformation of fiber 16. Nonetheless, fiber 16 produces negligible change to the orthogonal relationship between the polarization states of light beams E1 and E2.

At the measurement site, a beam splitter 24 divides light beams E1 and E2 into two paths. An output path 26 carries light beams E1 and E2 to the distance-measuring interferometer (hereafter "DMI") system. A monitor path 28 carries a fraction of the power from light beams E1 and E2 to components that monitor the polarization states P1" and P2" of beams E1 and E2 as described hereafter. Some or all of the components along the monitor path 28 can be located either at the measurement site or away from the measurement site. For example, light exiting components 38, 52, and 62 can be coupled to respective multimode fibers in conjunction with focusing lenses leading to the detector components away from the measurement site.

A beam splitter 30 splits light beams E1 and E2 on monitor path 28 into two paths. A path 32 carries light beams E1 and E2 to a first detector path 34, and a path 36 carries light beams E1 and E2 to other detector paths. First detector path 34 includes a polarizer 38 that allows the components of light beams E1 and E2 at a selected polarization state P3 to reach a light detector 40. A focusing lens may be interposed between polarizer 38 and light detector 40 to focus the light. In response to the light intensity received, light detector 40 transmits a beat signal B1 at a beat frequency of ($\omega 1 - \omega 2$) to an amplitude-sensing device 42. Beat signal B1' represents the optical power detected at beat frequency ($\omega 1 - \omega 2$). An amplifier may be interposed between light detector 40 and amplitude-sensing device 42 to amplify beat signal B1. Before polarizer 38, first detector path 34 can optionally include one or more wave plates 37. Wave plates 37 and polarizer 38 are selected according to the desired orientation of the output polarization states of light beams E1 and E2. In particular, wave plates 37 and polarizer 38 can be selected so that beat signal B1 is small (ideally zero) when polarizations P1" and P2" are along the desired directions.

A beam splitter 44 receives light beams E1 and E2 from path 36 and divides them into two paths. A path 46 carries light beams E1 and E2 to a second detector path 48, and a path 50 carries light beams E1 and E2 to another detector path. Second detector path 48 includes a polarizer 52 that allows the components of light beams E1 and E2 at a selected polarization state P4 to reach a light detector 54. A focusing lens may be interposed between polarizer 52 and light detector 54. In response to the light intensity received, light detector 54 transmits a beat signal B2 to a phase detector 56. An amplifier may be interposed between light detector 54 and phase detector 56. Before polarizer 52, second detector path 48 optionally includes one or more wave plates 51. Wave plates 51 and polarizer 52 are selected to generate a large beat signal B2 depending on the desired orientation of the output polarization states of light beams E1 and E2.

Path 50 carries light beams E1 and E2 to a third detector path 58. Third detector path 58 includes a polarizer 62 that allows the components of light beams E1 and E2 at a selected polarization state P5 to reach a light detector 64. A focusing lens may be interposed between polarizer 62 and light detector 64. In response to the light intensity received, light detector 64 transmits a beat signal B3 to phase detector 56. An amplifier may be interposed between light detector 64 and phase detector 56. Before polarizer 62, the third detector path 58 optionally includes one or more wave plates 60. Wave plates 60 and polarizer 62 are selected to generate a beat signal B3 that has a different phase relationship with beat signal B2 for each of the two possible solutions of E1 and E2 corresponding to a minimum amplitude detected by amplitude-sensing device 42 in first detector path 34. In one embodiment, the phase relationship is 90° out of phase (i.e., beat signals B2 and B3 are in quadrature) when beams E1 and E2 have the desired polarizations.

Phase detector 56 determines a phase difference $\Delta\Psi$ between beat signals B2 and B3. Amplitude-sensing device 42 determines an amplitude B1' of beat signal B1 at the beat tone frequency (i.e., $\omega 1-\omega 2$). A controller 43 uses amplitude B1' and phase difference $\Delta\Psi$ to generate control voltages or signals $V_1$, $V_2$, and $V_3$ that are applied to PSM 14 in order to achieve the desired polarization states P1" and P2" of light beams E1 and E2. Amplifiers may be interposed between controller 43 and PSM 14 to amplify the control signals $V_1$, $V_2$, and $V_3$. Controller 43 can be implemented using analog or digital components.

Specifically, controller 43 adjusts PSM 14 until beat tone amplitude B1' reaches one of two local minimums. Beat tone amplitude B1' has two local minimums, one minimum corresponding to linear polarizations P1" and P2" having the desired orientations, and the other minimum corresponding to linear polarizations P1" and P2" being rotated by 90°. Controller 43 uses phase difference $\Delta\Psi$ to uniquely determine the polarization states of E1 and E2 because the phase difference $\Delta\Psi$ has different values at the two minimums that correspond to the two orientations of E1 and E2. The exact correspondence between the values of phase difference $\Delta\Psi$ and the orientations of E1 and E2 can be derived conventionally using Jones calculus.

Figure 2:
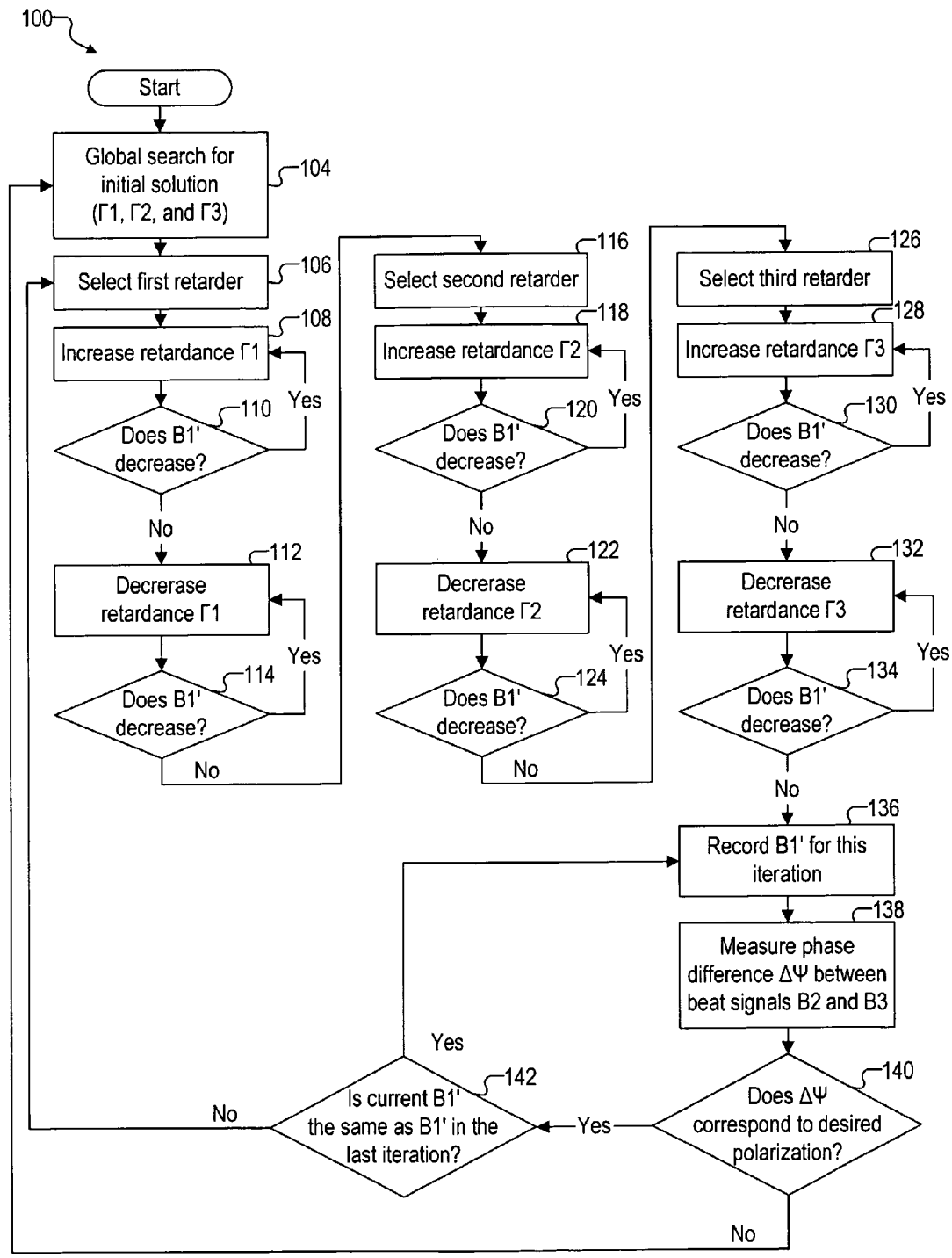
FIGS. 2 and 3 are flowcharts of methods for operating the polarization control system of FIG. 1.

FIG. 2 illustrates one embodiment of a method 100 for using system 10 to lock into a desired polarization orientation. In a step 104, controller 43 performs a global search for an initial solution of retardances $\Gamma 1$, $\Gamma 2$, and $\Gamma 3$ that would produce a local minimum with the correct polarization orientation. The values of $\Gamma 1$, $\Gamma 2$, and $\Gamma 3$ in the initial solution are used as the initial retardance values. One embodiment of step 104 is described later in reference to FIG. 3.

In steps 106 to 114, controller 43 adjusts retardance $\Gamma 1$ of retarder 18 to find the minimum value of beat tone amplitude B1' that can be achieved with retardance $\Gamma 1$. Specifically, in step 106, controller 43 selects retarder 18. In step 108, controller 43 increments retardance $\Gamma 1$ by adjusting voltage V1. In step 110, controller 43 determines if beat tone amplitude B1' has decreased. If so, step 110 is followed by step 108. Otherwise, step 110 is followed by step 112.

In step 112, controller 43 decrements retardance $\Gamma 1$ by adjusting voltage V1. In step 114, controller 43 determines if beat tone amplitude B1' has decreased. If so, step 114 is followed by step 112. Otherwise, step 114 is followed by step 116.

In steps 116 to 124, controller 43 adjusts retardance $\Gamma 2$ of retarder 20 to find the minimum value of beat tone amplitude B1' that can be achieved with retardance $\Gamma 2$. Step 124 is followed by step 126 once the minimum value of beat tone amplitude B1' has been achieved. In steps 126 to 134, controller 43 adjusts retardance $\Gamma 3$ of retarder 22 to find the minimum value of beat tone amplitude B1' that can be achieved with retardance $\Gamma 3$. Step 134 is followed by step 136 once the minimum value of beat tone amplitude B1' has been achieved.

In step 136, controller 43 records the value of beat tone amplitude B1' for the current iteration. In step 138, controller 43 determines phase difference $\Delta\Psi$ between beat signals B2 and B3. In step 140, controller 43 determines if the value of phase difference $\Delta\Psi$ corresponds to the desired output polarization states of E1 and E2. Phase difference $\Delta\Psi$ may not correspond to the desired output polarization states if there is a large and sudden change in the condition of fiber 16 that causes a large and sudden change in the polarization states of beams E1 and E2, which may cause the control loop to lose lock momentarily, and hence the system may not be locked to the same initial solution thereafter. If so, then step 140 is followed by step 104 where method 100 is repeated to search for another initial solution of retardances $\Gamma 1$, $\Gamma 2$, and $\Gamma 3$. If phase difference $\Delta\Psi$ corresponds to the desired output polarization states of E1 and E2, then step 140 is followed by step 142.

In step 142, controller 43 determines if the current beat tone amplitude B1' is the same as the beat tone amplitude B1' recorded from the previous iteration. If so, then step 142 is followed by 136 and method 100 loops until the beat tone amplitude B1' changes value. If the current beat tone amplitude B1' is not the same as the beat tone amplitude B1' recorded from the previous iteration, then step 142 is followed by step 106, and method 100 is repeated to search for another minimum beat tone amplitude B1'.

Figure 3:
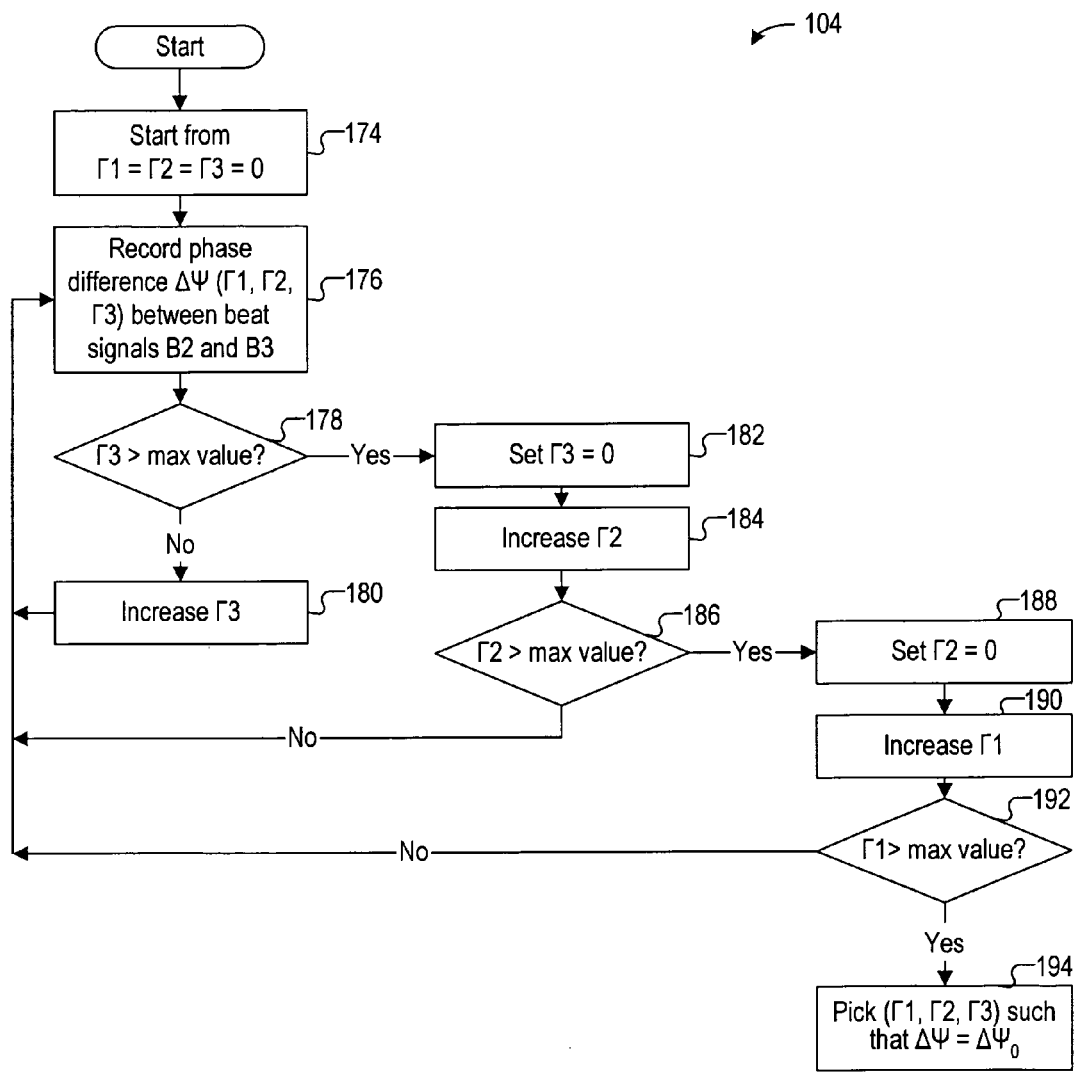

FIG. 3 illustrates one embodiment of step 104 where controller 43 searches through some or all of the polarization states of E1 and E2 for an initial solution of retardances $\Gamma 1$, $\Gamma 2$, and $\Gamma 3$ that produces the desired orientation of the polarization states of beams E1 and E2. In step 174, controller 43 initializes retardances $\Gamma 1$, $\Gamma 2$, and $\Gamma 3$ to 0. Minimum values of zero retardance are assumed here, but the search can start from any minimum value of retardances $\Gamma 1$, $\Gamma 2$, and $\Gamma 3$ achievable by the retarders or desired to be searched. In step 176, controller 43 records phase difference $\Delta\Psi$ between beat signals B2 and B3 generated with the current values of retardances $\Gamma 1$, $\Gamma 2$, and $\Gamma 3$. In step 178, controller 43 determines if retardance $\Gamma 3$ exceeds its maximum value. The maximum value may be the maximum retardance desired to be searched or that a retarder can achieve. If retardance $\Gamma 3$ exceeds its maximum value, then step 178 is followed by step 182. If retardance $\Gamma 3$ has not exceeded its maximum value, then step 178 is followed by step 180. In step 180, controller 43 increments retardance $\Gamma 3$ by adjusting voltage V3. Step 180 is followed by step 176 and the above steps loop until retardance $\Gamma 3$ exceeds its maximum value.

In step 182, controller 43 reinitializes $\Gamma 3$ to 0. In step 184, controller 43 increments retardance $\Gamma 2$ by adjusting voltage V2. In step 186, controller 43 determines if retardance $\Gamma 2$ exceeds its maximum value. If so, then step 186 is followed by step 188. If retardance $\Gamma 2$ has not exceeded its maximum value, then step 186 is followed by step 176 and the above steps loop until both retardances $\Gamma 3$ and $\Gamma 2$ exceed their maximum values.

In step 188, controller 43 reinitializes $\Gamma 2$ to 0. In step 190, controller 43 increments retardance $\Gamma 1$ by adjusting voltage V1. In step 192, controller 43 determines if retardance $\Gamma 1$ exceeds its maximum value. If so, then step 192 is followed by step 194. If retardance $\Gamma 1$ has not exceeded its maximum value, then step 192 is followed by step 176 and the above steps loop until retardances $\Gamma 3$, $\Gamma 2$, and $\Gamma 1$ exceed their maximum values. In step 194, controller 43 selects the values of retardances $\Gamma 3$, $\Gamma 2$, and $\Gamma 1$ that produce a desired phase difference $\Delta\Psi_0$, which corresponds to the desired output polarization states of component beams E1 and E2, as the initial solution for method 100.

Figure 4:
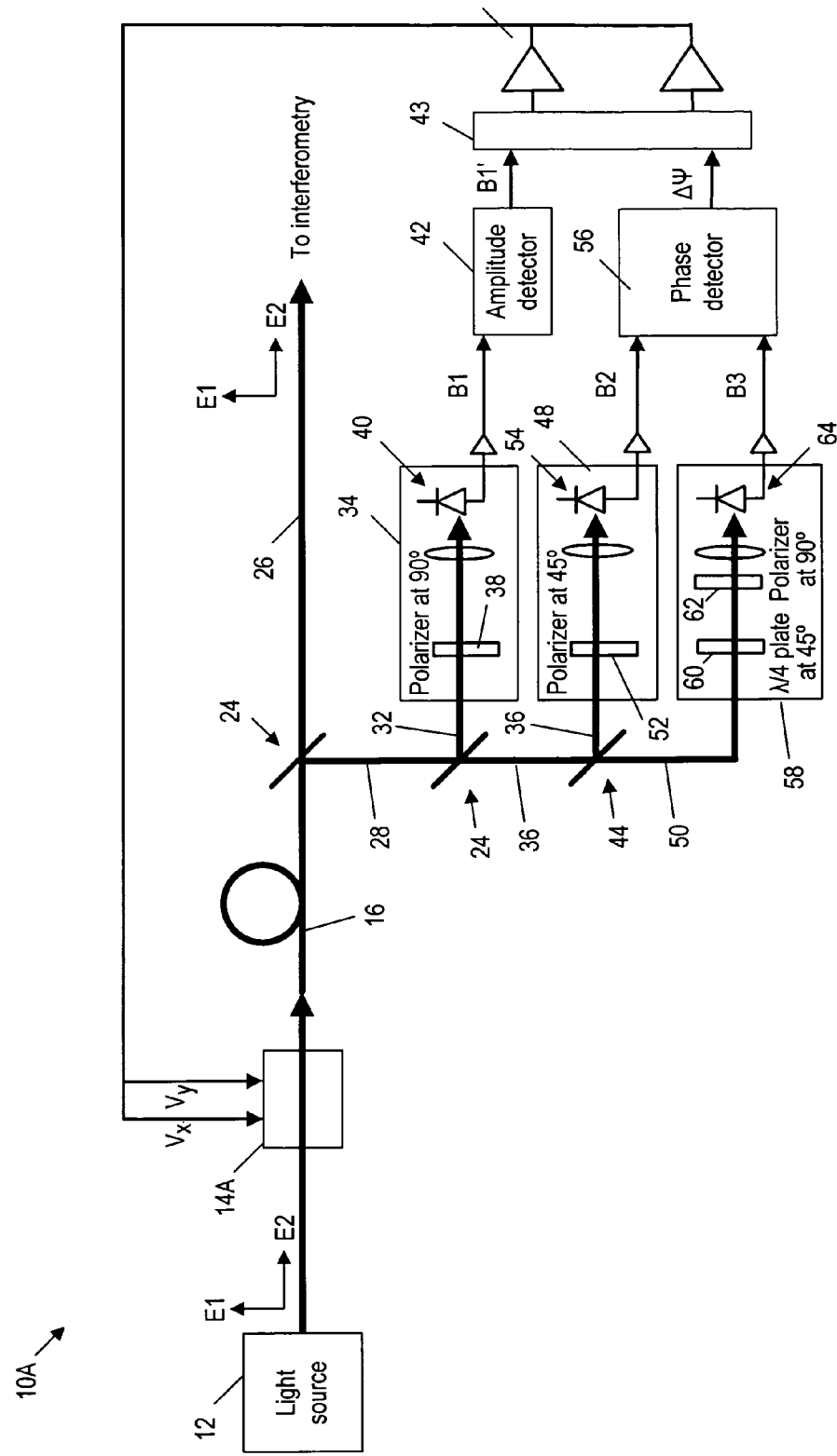
FIG. 4 illustrates a polarization control system in one embodiment of the invention for maintaining the polarization states of two orthogonal linearly-polarized light beams.

FIG. 4 illustrates one implementation of system 10 in FIG. 1, hereafter system 10A, which is applicable to a specific orientation of the polarization states in one embodiment of the invention. In system 10A, light beam E1 from beam source 12 initially has a vertical linear polarization (VLP) P1, and light beam E2 initially has a horizontal linear polarization (HLP) P2. In system 10A, the polarization states P1" and P2" of light beams E1 and E2 at the output of fiber 16 should be the same as polarization states P1 and P2, respectively. In this embodiment, polarizer 38 is oriented at 90°, polarizer 52 is oriented at 45°, wave plate 60 is a quarter-wave plate oriented at 45°, and polarizer 62 is oriented at 90°.

Figure 5:
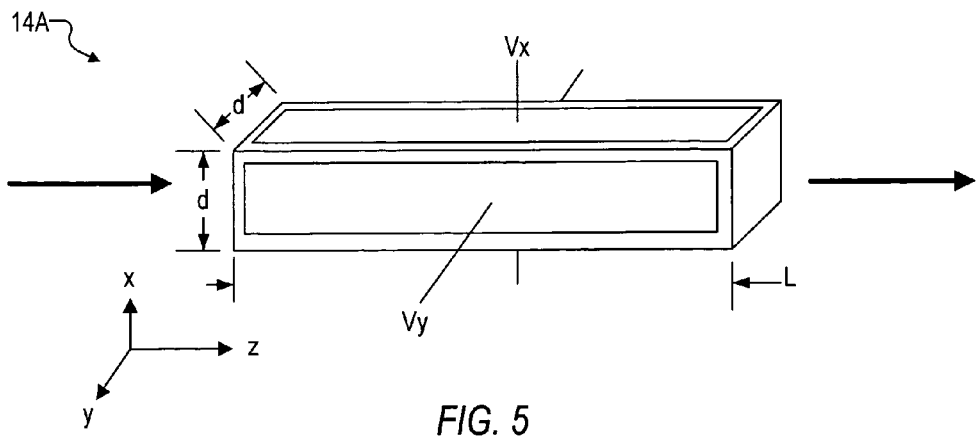
FIG. 5 illustrates a polarization state modulator in the polarization control system of FIG. 4.

FIG. 5 illustrates one embodiment of a PSM 14A used to adjust the polarization states of component beams E1 and E2 in system 10A (FIG. 4). PSM 14A is a rotatable variable retarder made of an electro-optic crystal, such as a lithium niobate crystal (LiNbO$_3$), with light propagation in the z-direction and voltages applied in the x and y-directions. The polarization axes and retardance of the LiNbO$_3$ are controlled by changing voltages $V_x$ and $V_y$ so that any input polarization state can be transformed into any output polarization state if both $V_x$ and $V_y$ operate over a range $[-V_\pi, V_\pi]$, where the half-wave voltage $V_\pi$ is $\lambda d/(2n_0^3 r_{22} L)$, $\lambda$ is the wavelength of the light beam, d is the width and height of the block of LiNbO$_3$, $n_0$ is the ordinary index of the LiNbO$_3$, and $r_{22}$ is the electro-optical coefficient of the LiNbO$_3$.

In one embodiment, system 10A can use a method similar to method 100 (FIGS. 2 and 3) to maintain the desired polarization states of component beams E1 and E2. Controller 43 first performs a global search to find initial values of voltages $V_x$ and $V_y$ that produce a desired phase difference $\Delta\Psi_0$. Controller 43 then performs a minimum search continuously to lock onto the minimum corresponding to the desired phase difference $\Delta\Psi_0$.

When a PM fiber is used in the systems described above, component beams E1 and E2 typically undergo a small polarization change (e.g., less than 20% power change through the polarizer). Thus, there may not be a need for a PSM that can generate all the possible input polarization states in order to find and lock to the desired output polarization states. In fact, a proper design can reduce the range of polarization states that needs to be searched, thereby allowing the elimination of some variable retarders and possibly the quadrature detection. For example, only polarization states covering half of the Poincare sphere (a mathematical construction which describes all polarization states) may need to be searched.

FIG. 6A illustrates one implementation of system 10 in FIG. 1, hereafter system 10B, which is applicable to small changes in the polarization states in one embodiment of the invention. In system 10B, beam source 12 generates a VLP beam E1 and a HLP beam E2. System 10B then maintains the polarization states of component beams E1 and E2 at the output of fiber 16.

A retarder 252 and a PSM 14B are used to produce a subset of the possible polarization states of component beams E1 and E2. Retarder 252 is a half-wave plate oriented at 22.5°. PSM 14B includes (1) a variable retarder 254 oriented at 0° and having a variable retardance that ranges from 0 to $\lambda/2$, and (2) a variable retarder 256 oriented at 45° and having a variable retardance that ranges from 0 to $\lambda/2$. Retarder 252 and PSM 14B allow approximately half of the Poincare sphere to be searched so system 10B will lock onto only one of the two minimums of beat tone amplitude B1', since the design excludes the other solution. Furthermore, retarder 252 and PSM 14B allow polarization states to be scanned continuously without any breaks within the region of interest (e.g., half the Poincare sphere) that would otherwise require one or more additional variable retarders to provide endless (i.e., reset-free) polarization control.

System 10B includes only one detector path, i.e., the first detector path 34 that generates beat signal B1. Controller 43 uses only beat signal B1 to lock onto the only minimum within the input polarization states that PSM 14B can produce. No global search for an initial solution is needed, as only one minimum is accessible within the input polarization states that retarder plate 252 and PSM 14B can produce. A search for the initial solution in half of the Poincare sphere is still required.

FIG. 6B illustrates a system 10C that is similar to system 10B but uses a different retarder and a different PSM. In particular, system 10C uses a quarter-wave plate 262 oriented at −45° and PSM 14A (FIG. 5). As described above, PSM 14A is a rotatable variable retarder controlled by voltages $V_x$ and $V_y$, wherein voltage $V_x$ operates over a range $[0, V_\pi]$ and voltage $V_y$ operates over a range $[-V_\pi, V_\pi]$. Retarder 262 and PSM 14A allow approximately half of the Poincare sphere to be searched continuously without any breaks in the polarization states that would otherwise require one or more additional rotatable variable retarders to provide endless polarization control.

Figure 6C:
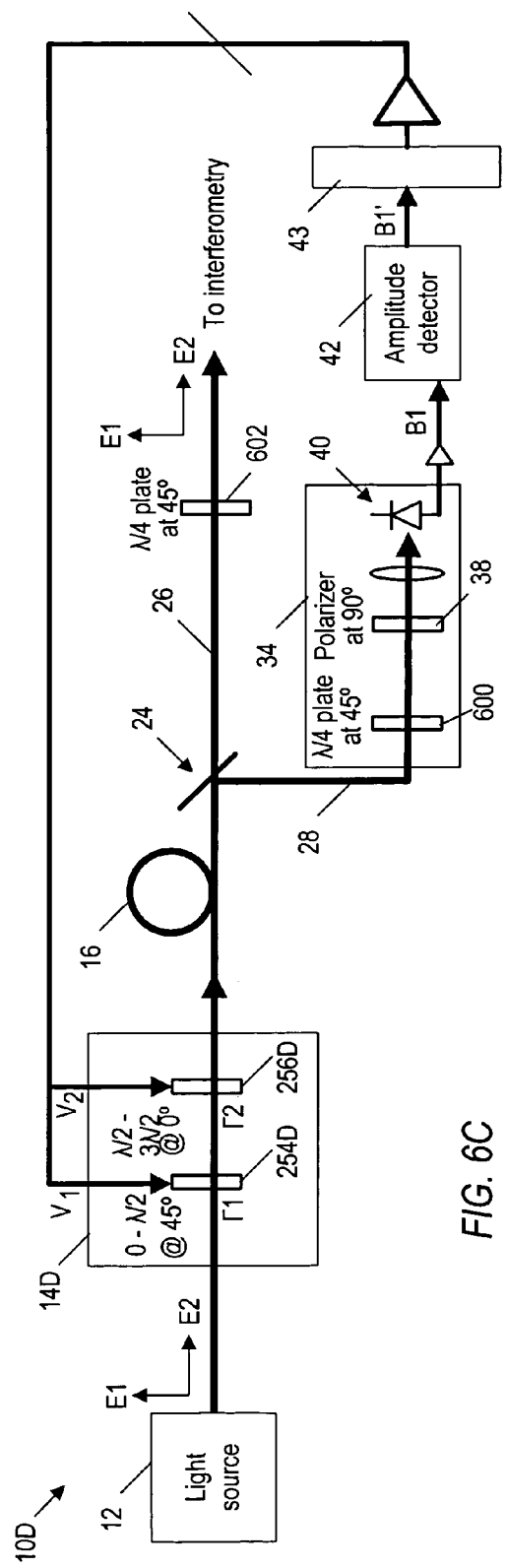

While the desired polarization states for a heterodyne interferometer typically correspond to a VLP beam E1 and a HLP beam E2, it is possible to design a system that locks component beams E1 and E2 to polarization states other than VLP and HLP while still obtaining VLP and HLP states before E1 and E2 enter the interferometer. FIG. 6C illustrates such a system 10D in one embodiment of the invention. System 10D is similar to systems 10B and 10C except for modifications described below. The input polarization states are a VLP beam E1 and a HLP beam E2. System 10D uses neither retarder 252 (FIG. 6A) nor retarder 262 (FIG. 6B). PSM 14D includes (1) a variable retarder 254D oriented at 45° and operating over a retardance range of 0 to $\lambda/2$, and (2) a variable retarder 256D oriented at 0° and operating over a retardance range of $\lambda/2$ to $3\lambda/2$. A quarter-wave plate 600 oriented at 45° is included in detector path 34 before polarizer 38 so that the minimum beat amplitude corresponds to a left circular polarization (LCP) state of beam E1 and a right circular polarization (RCP) state of beam E2. A second quarter-wave plate 602 oriented at 45° is included in path 26 to convert the LCP beam E1 and RCP beam E2 to a VLP beam E1 and a HLP beam E2 before they enter the interferometer.

Figure 6D:
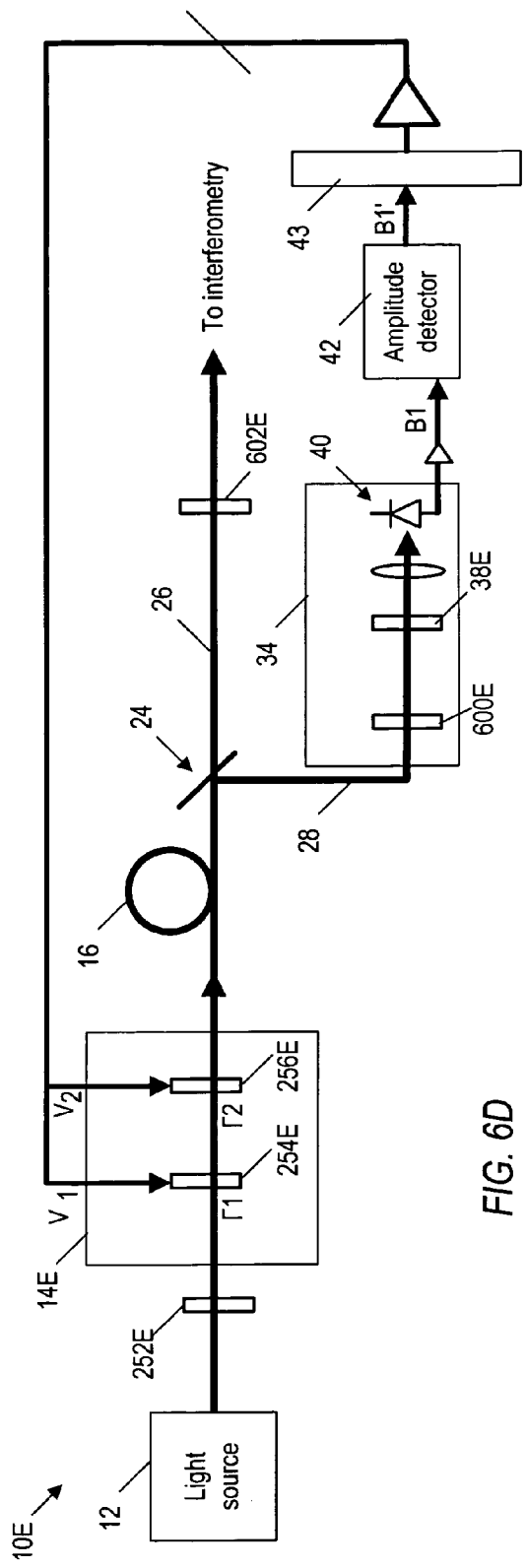

FIG. 6D illustrates a system 10E, which combines the features of system 10B and system 10D, in one embodiment of the invention. In system 10E, beam source 12 generates component beams E1 and E2 with polarization states depending on the application. Similar to system 10B, a retarder 252E and a PSM 14E can produce a subset of the possible polarization states of component beams E1 and E2. The retardance and the orientation of retarder 252E depend on the input polarization states and the desired output polarization states of E1 and E2. Similar to system 10D, a retarder 600E is included in detector path 34 before polarizer 38 so that the minimum beat amplitude corresponds to the desired polarization states of E1 and E2. A retarder 602E is included in path 26 to convert component beams E1 and E2 to the desired polarization states before component beams E1 and E2 enter the interferometer. Again, the retardance and the orientation of retarder 602E depend on the desired polarization states of beams E1 and E2.

Figure 7:
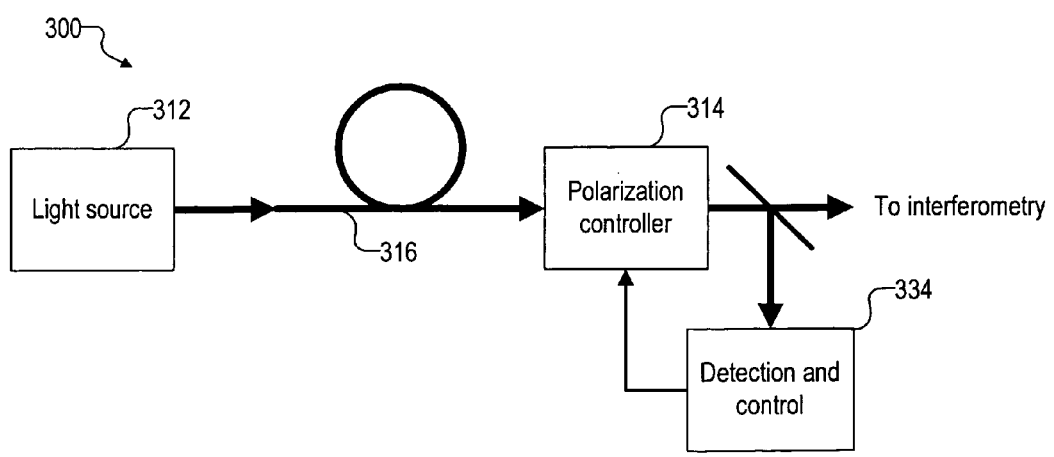
FIG. 7 illustrates a non-remote configuration of a polarization control system in one embodiment of the invention.

The various embodiments of the polarization control system described above have all been shown in a remote operation configuration, where the PSM is located upstream from the fiber and the measurement site. FIG. 7 illustrates an embodiment of a non-remote polarization control system 300 where a PSM 314 is located downstream from a fiber 316 near the measurement site. As can be seen, a light source 312 launches two light beams with orthogonal polarization states and different frequencies into fiber 316. Fiber 316 then carries the two light beams to PSM 314. PSM 314 adjusts the polarization states of the two light beams before sending them to an output path and a monitor path. PSM 314 can be implemented using similar principles as those discussed in conjunction with FIGS. 1, 4, 5, 6A and 6B. The output path leads to interferometer optics. The monitor path leads to a detection and control block 334 that generates the feedback control to PSM 314 to maintain the desired output polarization states of the two light beams. Block 334 can be implemented in a similar way as those described above with reference to FIGS. 1, 4, 6A, and 6B.

Figure 8:
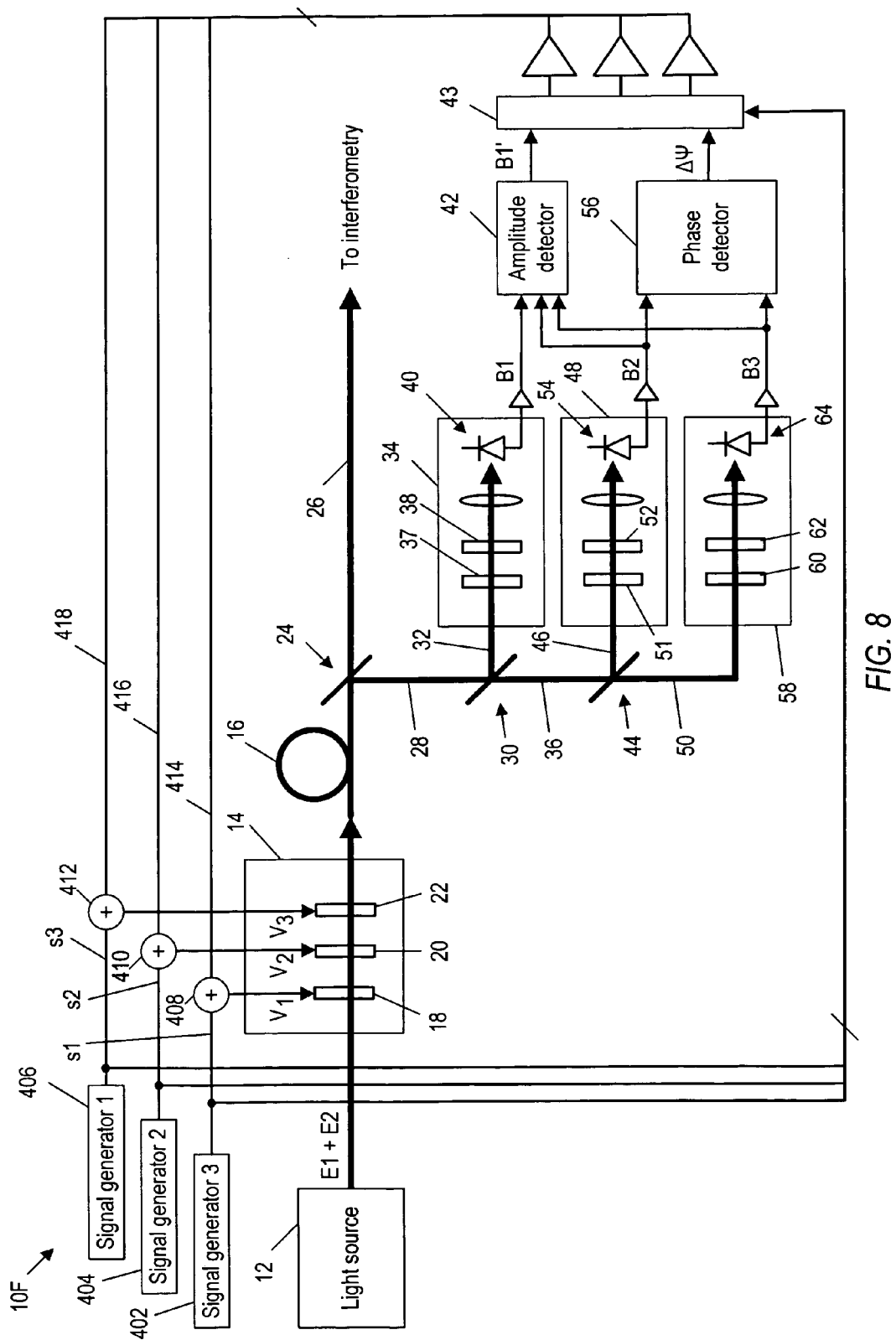
FIG. 8 illustrates a polarization control system using dithering to maintain the polarized states of two orthogonal light beams in one embodiment of the invention.

FIG. 8 illustrates another implementation of system 10 in FIG. 1, hereinafter system 10F, which locks onto the desired beat tone amplitude B1' using dithering. The technique of dithering generates small modulation terms to each control signal in order to aid the detection of the derivative of the detected signal (including sign). This technique also filters out changes in amplitude detected by amplitude-sensing device 42 due to other factors such as mechanical vibration and temperature variation. System 10F is similar to system 10 but additionally includes signal generators 402, 404, and 406 and adders 408, 410, and 412. Signal generators 402, 404, and 406 generate small orthogonal modulation signals s1, s2, and s3 (which could be sinusoidal at frequencies f1, f2, and f3). Controller 43 detects signals s1, s2, and s3 and generates three signals 414, 416, and 418 using correlation techniques, which are added to corresponding control dither signals s1, s2, and s3 to generate control signals $V_1$, $V_2$, and $V_3$ to variable retarders 18, 20, and 22, respectively.

Various other adaptations and combinations of features of the embodiments disclosed are within the scope of the invention. For example, the desired output polarization states do not need to be the same as the input polarization states emerging from the light source. One embodiment of system 10B in FIG. 6A can be used for input polarization states corresponding to a left circularly-polarized beam E1 and a right circularly-polarized beam E2 from the laser, and for generating desired output polarization states corresponding to a VLP beam E1 and a HLP beam E2. In such an embodiment, retarder 252 would be a quarter-wave plate oriented at 90°. Similarly, one embodiment of system 10C in FIG. 6B can be used for input polarization states corresponding to a left circularly-polarized beam E1 and a right circularly-polarized beam E2 from the laser, and for generating desired output polarization states corresponding to a VLP E1 and a HLP E2. In such an embodiment, retarder 262 would not be needed.

Various alternative embodiments of the PSM can be used in the embodiments described above. One embodiment of the PSM includes two or more fiber squeezers whose birefringence properties are varied by the application of mechanical stresses. Mechanical stresses are applied to the fiber squeezers in response to the control signals from controller 43. Another embodiment of PSM includes two or more liquid crystal cells whose retardances and/or polarization axes are varied in response to the control signals from controller 43. Yet another embodiment of PSM includes two or more mechanically rotatable wave plates with fixed retardance. The wave plates are rotated in response to the control signals from controller 43. Yet another embodiment of the PSM includes two or more photoelastic modulators whose linear birefringence are induced by the application of mechanical stresses. Mechanical stresses are applied to these photoelastic modulators in response to the control signals from controller 43.

Figure 9:
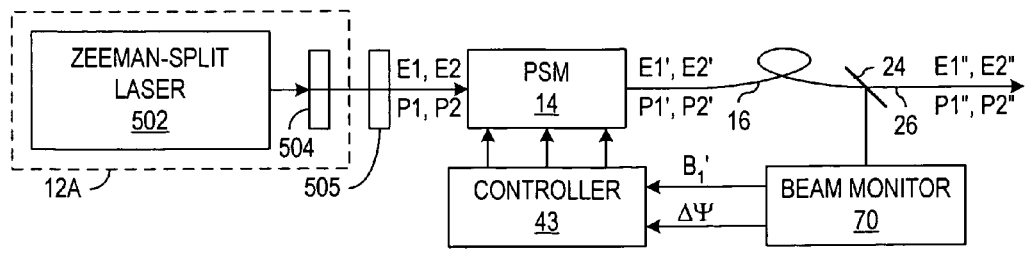
FIG. 9 illustrates a system in accordance with an embodiment of the invention employing a Zeeman-split laser and active control of polarizations output from an optical fiber.

Various alternative embodiments of the beam source that provide the initial heterodyne light beam can also be employed. FIG. 9 illustrates an exemplary embodiment of the invention in which a beam source 12A includes a Zeeman-split laser 502 such as in the 5517D laser mentioned above. In Zeeman-split laser 502, an axial magnetic field applied to the resonant cavity in the laser produces a beam with two orthogonal circularly-polarized components that have different frequencies. Optical system 504, which preferably includes a quarter-wave plate, converts the orthogonal circularly-polarized components into orthogonal linearly-polarized component beams E1 and E2 suitable for polarization control as described above.

An optical system 505 including one or more waveplates converts the two orthogonal polarizations from beam source 12A into two appropriate orthogonal polarization states. The orthogonal polarization states chosen depend on the exact configuration of the PSM, such as those shown in FIGS. 6A to 6D. The waveplates in system 505 may be combined with waveplate 504 depending on construction of beam source 12A. Other embodiments discussed below may also include a similar optical system 505 having the function as described here. This description however, is not repeated in each of the following embodiments.

Beam source 12A transmits the dual-frequency or heterodyne beam through PSM 14 and a polarization maintaining optical fiber 16 to beam splitter 24 and through beam splitter 24 to a path 26 to further interferometer optics. As described above, the PSM can either precede the fiber as shown in FIG. 9 or follow the fiber as shown in FIG. 7. Beam splitter 24 also directs a fraction of the heterodyne beam into a polarization monitoring system 70. Monitoring system 70, which generally determines whether the output beam from the transmission system including optical fiber 16 and PSM 14 has the desired polarization components, can be implemented using a beat signal amplitude detector with or without a phase detector as described above. Based on the measurements of monitoring system 70, controller 43 sets the control signals for PSM 14 as required to ultimately result in the output beam components E1" and E2" having the desired polarizations P1" and P2".

Depending on the configuration of PSM 14, birefringence waveplates may be included after splitter 24 if necessary to convert the two orthogonal polarization components in beam 26 to vertical and horizontal linear polarization components. More generally, similar elements that provide fixed changes of the orthogonal polarizations can be provided in any of the disclosed embodiments of the invention, even where the discussion of such elements is not be repeated.

Figure 10:
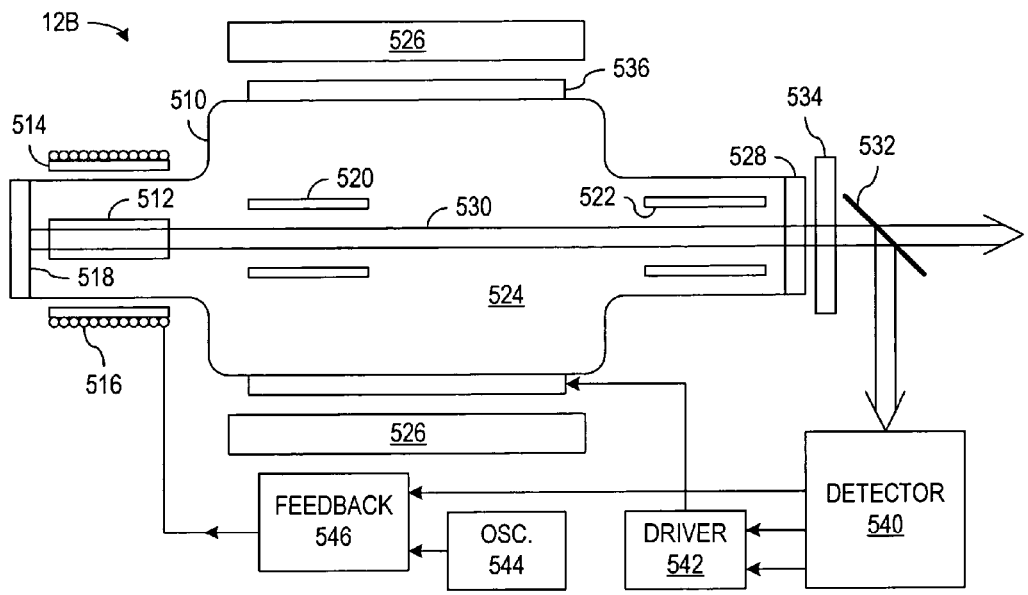
FIG. 10 shows a Zeeman-split laser with cavity elements for control and stabilization of frequency difference and polarization.

FIG. 10 illustrates a specific embodiment of an actively stabilized Zeeman-split laser 12B similar to a laser disclosed in U.S. Pat. No. 5,586,133, which is hereby incorporated by reference in its entirety. Zeeman-split laser 12B includes a tube 510 containing electrodes 520 and 522 that can be driven (e.g., with an RF signal) to cause a population inversion in a laser gain medium 524. An output coupler mirror 528 and a reflector 518 are at the ends of tube 510, and define the length of the resonant cavity.

A permanent magnet 526 produces an axial magnetic field along the direction of a light beam 530 oscillating between output coupler mirror 528 and reflector 518. The axial magnetic field has two effects on laser gain medium 524. The applied magnetic field causes the Zeeman effect, which splits gain curve of medium 524 into two gain curves, one for left circularly-polarized light and the other for right circularly-polarized light. Additionally, the Faraday effect splits the real part of refractive index curve into two curves, one for left circularly-polarized light and the other for right circularly-polarized light. As a result, the output beam 530 transmitted through output coupler mirror 528 has a left circularly-polarized component with a wavelength that differs from the wavelength of the right circularly-polarized component of light beam 530. An optical element 534 such as a quarter-wave plate can transform the orthogonal circularly-polarized components of beam 530 into orthogonal linear components.

Zeeman-split laser 12B further uses an adjustable magneto-optical apparatus in and around tube 510 to increase the split frequency difference between the two polarizations. The magneto-optical apparatus includes an optically transparent medium 512 in the path of beam 530 in tube 510, a permanent magnet 514 that is outside of enclosure 510 and surrounding optically transparent medium 512, and an electromagnet 516 surrounding permanent magnet 514. Permanent magnet 514 and electromagnet 516 produce a magnetic field of adjustable magnitude along the direction of laser beam 530. Since the Faraday effect is many orders of magnitude stronger in optically transparent medium 512 than in laser gain medium 524, the magnitude of frequency split introduced by the optically transparent medium can be much larger than that of the laser gain medium. In addition to increasing the frequency split, the optically transparent medium also permits active stabilization of the frequency difference between the polarization components.

To stabilize the absolute frequencies and the difference frequency of the polarization components of beam 530, a beam splitter 532 reflects a portion of beam 530 to a detector 540. In the illustrated embodiment, detector 540 detects the frequency difference between the two orthogonal polarization components of beam 530 and detects at least one of the component frequencies. If a detected frequency differs from the desired frequency, a drive circuit 542 adjusts cavity length of tube 510 (e.g., by setting the power to a heating element 536 causing tube 510 to expand or contract) as required to adjust the output frequency. Detector 540 also generates an electrical signal having the difference or beat frequency for the polarization components of beam 530. Feedback control circuit 546 compares the signal from detector 540 to the frequency of an electronic oscillator 544 and actively adjusts the current through electromagnet 516 to set the magnetic field in medium 512 to a strength that provides the desired frequency difference.

Figure 11A:
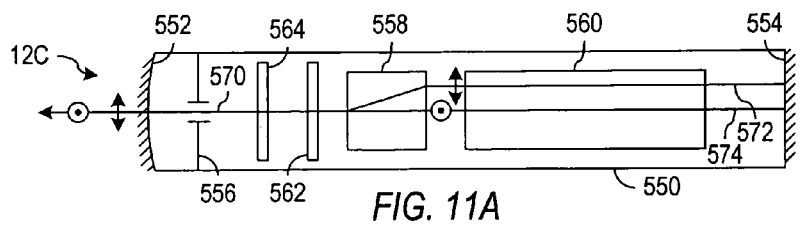
FIGS. 11A and 11B illustrate alternative embodiments of lasers using birefringent materials in laser cavities to create a frequency difference between polarization components.

Including a birefringent material in a laser cavity is another method for generating a heterodyne beam as described in U.S. Pat. No. 5,091,912, which is hereby incorporated by reference in its entirety. FIG. 11A schematically shows a laser 12C including a birefringent block 558 and other laser gain medium 560 in a resonant cavity 550 having a length defined by the separation of mirrors 552 and 554. In a well-known arrangement, one mirror 554 can be flat while the other mirror 552 is spherically concave and centered on mirror 554. Laser 12C also includes electrodes or other means (not shown) for causing lasing, e.g., for causing gas discharge using an RF current. An aperture 556 placed close to concave mirror 552 can select the fundamental transverse mode of beam 570 in resonant cavity 550.

As shown in FIG. 11A, the positions of aperture 556, birefringent block 558, and other components of laser 12C are such that two orthogonal linear polarization components defined by the optical axes of birefringent block 558 have separate paths 572 and 574 of different optical lengths, causing resonant cavity 550 to have two resonant modes. A first plate 562, which is a quarter-wave for the mean frequency of the two modes, is in close proximity to birefringent block 558, on the side of block 558 where the ordinary beam and the extraordinary beam follow the same path. The neutral lines of quarter-wave plate 562 are at 45° from the polarization axes of birefringent block 558, so as to balance the light intensities of the two modes excited in the lasing cavity 510. A second quarter-wave plate 564, also placed in the common path of the two beams, is more remote from block 558 than is plate 562. Angular adjustment of plate 564 about the direction of the light beams can adjust the difference between the frequencies of the two resonant modes.

The frequency difference can be changed by angular adjustment of plate 564. Accordingly, a feedback control system similar to the one discussed in paragraph in regard to FIG. 10 can stabilize the frequency difference between the two polarization components from laser 12C. In this case, the feedback controller adjusts the angle of plate 564 to change the frequency difference.

FIG. 11A illustrates an embodiment of laser 12C where output through mirror 552 provides collinear output of both frequency/polarization components. Alternatively, output through mirror 554 would provide separate beams having differing frequencies and polarizations.

Figure 11B:
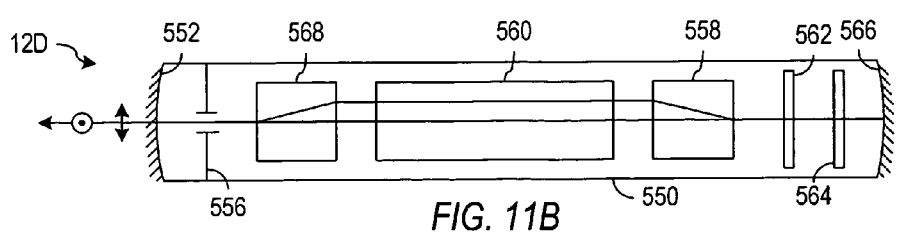

FIG. 11B shows a laser 12D having a configuration using two birefringent blocks 558 and 568. Components of laser 12D are arranged so that a zone of cavity 550 in which the inherent oscillation states are separated spatially is away from both mirrors 552 and 566, which may consequently be concave mirrors. In particular, birefringent blocks 558 and 568, which may be substantially identical, are positioned in cavity 550 so that the propagation paths of the two polarization states merge outside a zone straddling active lasing medium 560. Laser 12D thus formed may have a better immunity to deformation of cavity 550.

Figure 12A:
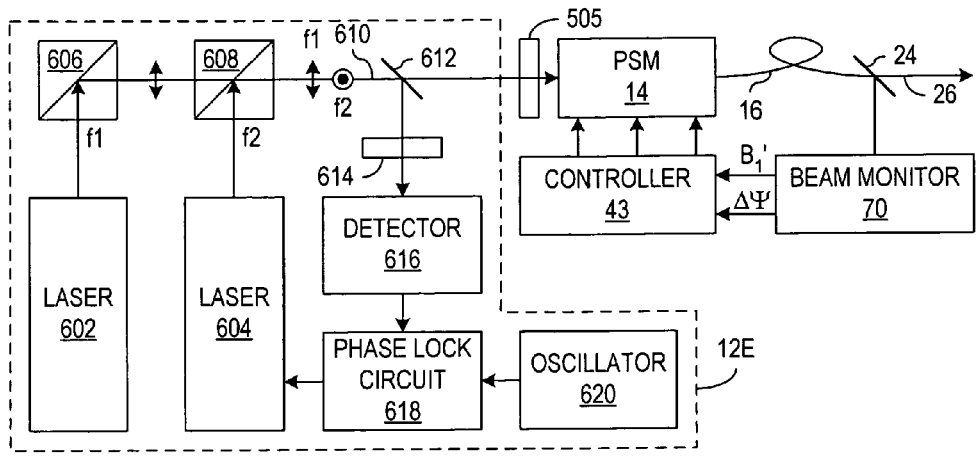
FIGS. 12A and 12B illustrate polarization control systems in accordance with embodiments of the invention that use phase-locked lasers.

Another technique for producing a heterodyne beam containing polarization components with different frequencies uses a pair of phase-locked lasers. FIG. 12A shows a system including a beam source 12E containing two lasers 602 and 604. Laser 602, which can be a frequency-stabilized laser, directs a beam having a first frequency f1 into a reflector or a polarizing beam splitter (PBS) 606. PBS or reflector 606 reflects a polarization component of the input beam to a second PBS 608 that is transparent to that polarization component. PBS 608 also receives a beam having a frequency f2 from laser 604 and reflects a polarization component that is orthogonal to the transmitted polarization component from PBS 606. A resulting combined beam 610 from PBS 608 includes orthogonal polarization components that have respective frequencies f1 and f2.

Accurate control of the frequency difference f2−f1 can be maintained using active feedback. In particular, beam source 12E includes a beam splitter 612 that reflects a portion of beam 610 through a polarizer 614 into a detector 616. With polarizer 614 having an axis that is at 45° with the polarizations of the frequency components of beam 610, detector 616 can generate an electrical signal having the beat frequency f2−f1 of the two frequency components. A phase-lock circuit 618 compares the frequency of the signal from detector 616 to an electronic reference frequency from an oscillator 620 and generates a control signal that sets the output frequency f2 of laser 604. For example, phase lock circuit 618 can control the power provided to a heating element or other device that controls the length of the resonant cavity in laser 604. In this manner, the frequency difference f2−f1 can be tightly controlled as required for precision interferometer measurements.

Figure 12B:
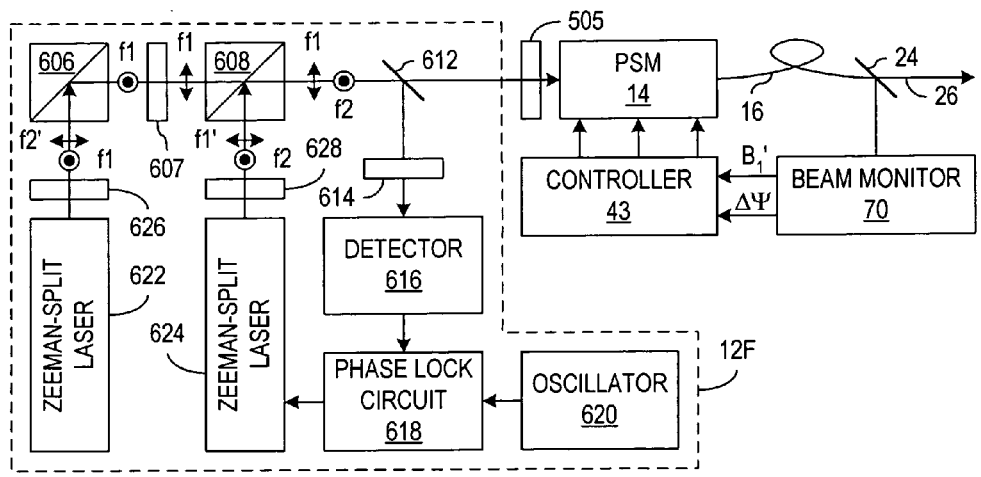

FIG. 12B illustrates a beam source 12F according to an embodiment using coupled Zeeman-split lasers 622 and 624 to generate a heterodyne beam with the desired properties. Laser 622 produces a beam with left and right circularly-polarized components having frequencies f1 and f2'. A quarter-wave plate 626 between laser 622 and PBS 606 converts orthogonal circularly-polarized components into vertical and horizontal linearly-polarized components such that PBS 606 reflects only light having frequency f1. Similarly, laser 624 produces a beam with left and right circularly-polarized components having frequencies f1' and f2, and a quarter-wave plate 628 between laser 624 and PBS 608 converts orthogonal circularly-polarized components into vertical and horizontal linearly-polarized components such that PBS 608 reflects only light having frequency f2. In an embodiment where PBS 606 and 608 are identical, a half-wave plate 607 can be included between PBS 606 and 608 so that the polarization component reflected in PBS 606 is transmitted through PBS 608. Detector 616 as described above can measure a portion of the combined output beam from PBS 608 to permit phase lock circuit 618 to control laser 624 as required to maintain a desired frequency difference f2−f1.

The output beam from beam source 12E or 12F can thus be used with a polarization control system including a PSM 14, an optical fiber 16, a beam monitor 70, and a controller 43 having the functions described above. Alternatively, the functions of beam monitor 70 and detector 616 can be integrated into a single system that measures the properties of the output beam and actively controls both PSM 14 and the coupled light sources to ensure that the heterodyne beam used for interferometer measurements has the desired frequencies and polarizations. U.S. Pat. No. 6,052,186 further describes beam sources including dual laser systems and is hereby incorporated by reference in its entirety.

Figure 13:
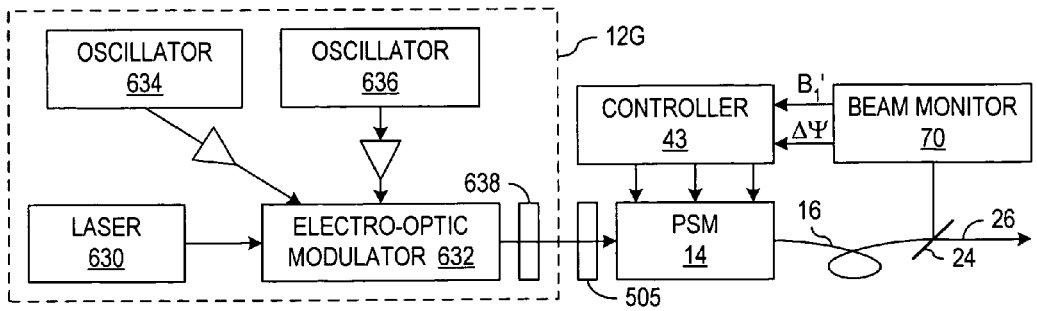
FIG. 13 illustrates a polarization control system in accordance with an embodiment of the invention in which a beam source uses an electro-optic modulator in generating a heterodyne beam.

Another way to generate a heterodyne beam for an interferometer is to use an electro-optic modulator on the output beam from a laser. FIG. 13 shows an example of a beam source 12G that uses an electro-optic modulator 632 to split the frequencies of orthogonal circularly-polarized components output from a laser 630. The laser 630 can be a monochromatic laser or a Zeeman-split laser, and electro-optic modulator 632 can be made of a material such as lithium niobate. The modulator can be configured to act as a rotating half-wave plate that creates a frequency shift between the left and right circular polarization components. Since the modulator creates a frequency shift between the left and right circular polarization components, laser 630 must produce both left and right circular components (at the same or different frequencies), preferably with similar optical powers. One or more waveplates may be included between the laser 630 and modulator 632 to convert polarization states of the beam from laser 630 into left and right circular polarizations. The following presumes a modulator made of lithium niobate crystal, although other materials may be used. In order for the modulator to act as a rotating half-wave plate, an amplified electrical oscillator 634 applies a first AC voltage of the form $V_\pi \sin(2\pi f_a t)$ to electro-optic modulator 632 to create a corresponding electric field component in the X-direction perpendicular to the propagation of the beam, and another amplified oscillator 636 applies a second AC voltage of the form $V_\pi \cos(2\pi f_a t)$ to create a corresponding electric field component in the Y-direction perpendicular to the propagation of the beam, where $V_\pi$ is the half-wave voltage and $f_a$ is the drive frequency. The out-of-phase applied voltages $V_\pi \sin(2\pi f_a t)$ and $V_\pi \cos(2\pi f_a t)$ cause electro-optic modulator 632 to act as a half-wave plate having an axis rotating at an angular rate of $7\pi f_a$ radians per second. As a result, modulator 632 creates a frequency difference of $2f_a$ between left and right circularly-polarized components of the beam traversing modulator 632. An optical element such as a quarter-wave plate 638 can convert the orthogonal circular polarizations into orthogonal linear polarization suitable for a polarization control system including PSM 14, optical fiber 16, monitor 70, and controller 43.

Acousto-optic modulators (AOMs) can also be used to create or increase the frequency difference between polarization components. U.S. Pat. No. 5,485,272, for example, describes several heterodyne beam sources employing AOMs and is hereby incorporated by reference in its entirety. An example of an AOM is an acousto-optic Bragg cell (e.g., a uniaxial birefringent crystal) with an attached electro-acoustic transducer. The electro-acoustic transducer converts the electrical signal into sound waves that the transducer launches through the birefringent crystal. In one embodiment, the birefringent crystal can be oriented such that sound waves propagate along the optic axis of the crystal. The sound waves formed in the material generate refractive index variations in the material, resulting in a three-dimensional diffraction grating known as a Bragg grating. This grating diffracts a beam traversing the modulator into a plurality of diffraction orders.

In order to concentrate as much radiation as possible in one diffracted order, Bragg's condition should be met for that particular order. For example, in the case of maximizing diffracted power into the first order, the condition $\sin \theta_d = \lambda f_a / (2V_a)$ should be met, where $\theta_d$ is the angle which the input beam makes with the Bragg grating lines, $f_a$ is the acoustic frequency, $\lambda$ is the optical wavelength of the input beam, and $V_a$ is acoustic velocity. As a result of Bragg diffraction, the output optical wave from the birefringent crystal is subject not only to diffraction but also to a frequency shift. Only the undiffracted order propagates through the crystal with no change in propagation angle and optical frequency; all other diffracted orders undergo a change in propagation angle as well as a shift in optical frequency depending on several parameters such as the diffracted order, the propagation direction of the acoustic wave relative to that of the input beam, and the drive frequency. The text "Acousto-Optic Devices: Principles, Design, and Applications," Jieping Xu & Robert Stroud, John Wiley & Sons Inc., 1992 further describes the operation of AOMs.

Figure 14A:
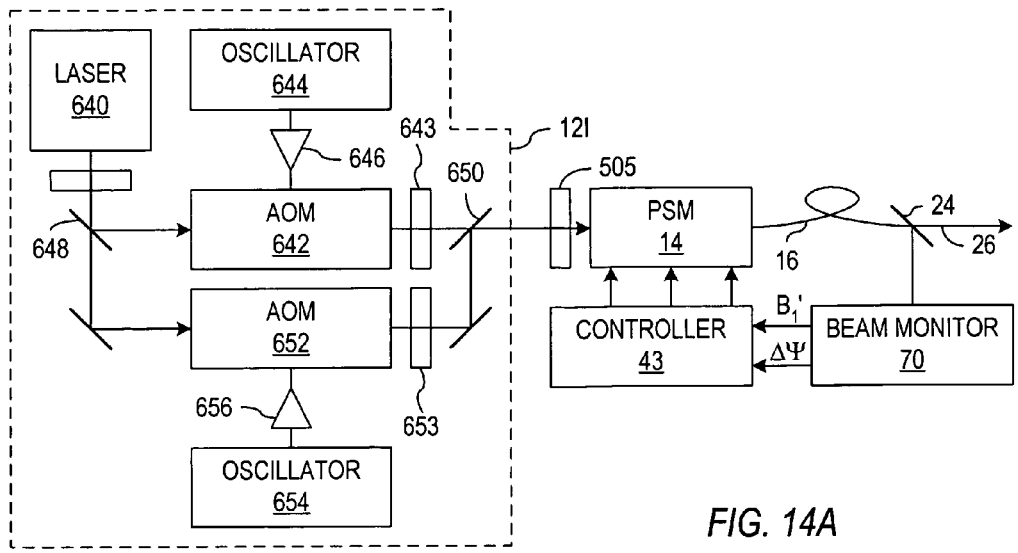
FIGS. 14A, 14B, and 14C illustrate beam sources incorporating a variety of different configurations for use of acousto-optic modulators on separated polarization components.
Figure 14B:
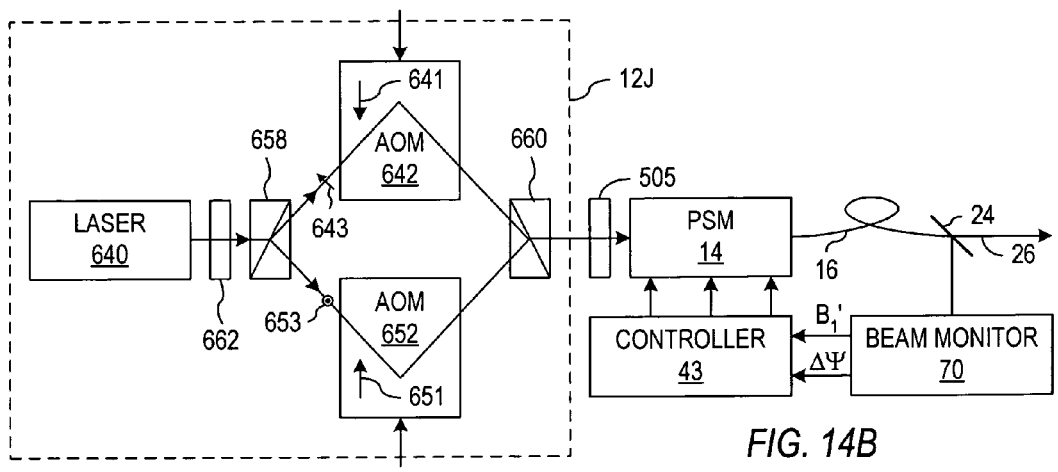
Figure 14C:
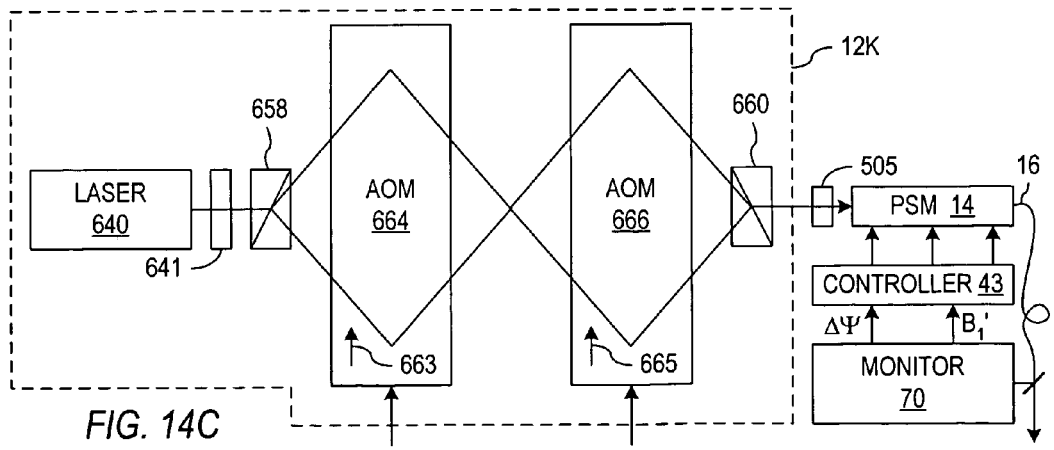

FIGS. 14A to 14C illustrate some alternative embodiments for heterodyne beam sources using one or more AOM.

FIG. 14A illustrates a beam source 12I using a Zeeman laser 640 and a pair of AOMs 642 and 652. A polarizing beam splitter 648 directs a first (e.g., vertical linear) polarization component and a second (e.g., horizontal linear) polarization component into two separate paths. The input beam can then enter the crystals of AOMs 642 and 652 at the Bragg angle for the first diffracted order. An oscillator 654 with amplifier 656 drives AOM 652 to create a traveling acoustic wave that shifts the frequency of the diffracted second polarization component. In this embodiment, both AOM 642 and AOM 652 increase the frequencies of the first and second polarization components so that an added frequency difference between the polarization components is equal to the difference in the drive frequencies to AOM 642 and AOM 652, respectively, which is chosen to be non-zero. This configuration allows generation of polarization components that have a frequency difference substantially smaller than each drive frequency to the AOM 642 or 652.

Since propagation direction of the diffracted beam is different from that of the input beam in general, alignment optics 643 and 653 are used to adjust the propagation angle of the separate polarization components output from respective AOMs 642 and 652 so that they travel the required paths for entering beam combiner 650. Beam combiner 650 recombines the polarization components into a collinear beam suitable for transmission on a single fiber 16 in a polarization monitoring system including PSM 14, beam monitor 70, and controller 43.

FIG. 14B shows another configuration capable of generating a beam with polarization components having a frequency difference substantially smaller than each drive frequency to the AOM. In FIG. 14B, a beam source 12J includes a polarizing beam splitter 658 and a beam combiner 660 implemented using birefringent material. Each element 658 or 660 may be a birefringent system such as a Wollaston prism, a Fresnel prism, a Koester prism, or a Rochon prism. Such birefringent systems may be separate optical elements or integrated into the material of the AOMs 642 or 652. Alternatively, instead of a birefringent element, other systems such as a diffraction grating or a phase grating can be used for beam splitting and/or combining.

Polarization optics 662 can be included immediately after Zeeman-split laser 640 if necessary so that light incident on PBS 658 is linearly polarized at 45° to the polarization axis of PBS 658. As a result, the two polarization components exiting PBS 658 carry similar optical powers, which is generally preferred for heterodyne interferometer applications, and have polarization directions 643 and 653, respectively, as shown in FIG. 14B. Polarization optics 662 can also be chosen to produce an arbitrary polarization state other than linear polarization at 45° if different optical powers for the two beams are desired. The separated beam components from PBS 658 traverse respective AOMs 642 and 652 having respective optical axes 641 and 651. PBS 658 is designed such that the two output beams enter each of the AOM 642 and AOM 652 respectively at the Bragg angle of the desired diffracted order.

AOMs 642 and 652 cause frequency shifts in the respective traversing beams. The opposite drive directions to AOM 642 and 652 in FIG. 14B result in generation of a beam with two polarization components whose frequency difference is given by the frequency difference of the two drive frequencies. Alternatively, the frequency difference between the two polarizations can be made equal to the sum of the drive frequencies if the drive directions are the same for AOM 642 and AOM 652; however this configuration is generally less useful for heterodyne interferometers.

FIG. 14C illustrates another beam source 12K in which beam splitter 658 separates the polarization components but directs both polarization components sequentially through AOMs 664 and 666 having respective optic axes 663 and 665. The separated polarization components travel in opposite directions through AOM 664. Accordingly, the sign of the frequency shift that AOM 664 introduces is opposite for the two polarization components. Diffraction of the separated polarization components in AOM 664 directs the polarization components into AOM 666, which again introduces opposite frequency shifts before beam combiner 660 recombines the polarization components into a collinear beam. A system including a series of three or more AOMs can be similarly constructed. The resulting output beam from beam source 12K contains a beam with two polarization components whose frequencies differ by two times the difference between the drive frequencies applied to AOM 664 and AOM 666, respectively. As a result, a beam with two orthogonally polarized components that have a frequency difference substantially smaller than twice the acoustic frequency can be produced.

In another embodiment of beam source 12K, laser 640 can be a Zeeman-split laser. Polarization optics 641 immediately following laser transform left and right circular polarizations from the Zeeman-split laser 640 into two output beams with orthogonal linear polarizations having polarization direction aligned with the polarization axis of the polarizing beam splitter 658. As a result, PBS 658 splits the two beams, each with a different frequency, into two orthogonally-polarized beams, which propagate through the AOMs 664 and 666, respectively. In this embodiment, the two AOMs are used to increase the frequency split between the two orthogonal components, which have an initial non-zero frequency difference when emerging from Zeeman-split laser 640. Polarization beam splitter 660 then recombines the two beams to form a single output beam with two orthogonal linear polarizations and an increased frequency split.

Figure 15:
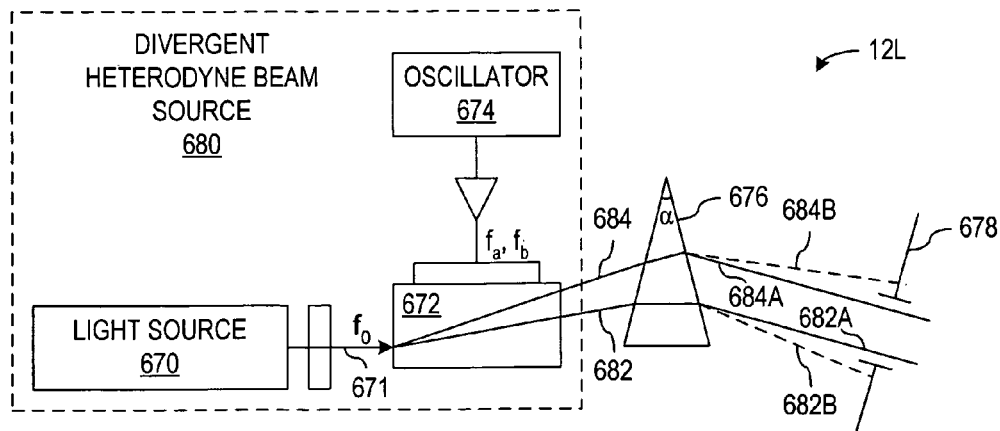
FIG. 15 illustrates a beam source using a dual frequency acoustic wave in an acousto-optic crystal to produce a frequency difference between diverging diffracted beams.

FIG. 15 illustrates a beam source 12L including a source 670 of a monochromatic beam and an acousto-optic Bragg cell 672 using an alternative technique for generating a heterodyne beam. In beam source 12L, the single light beam 671 incident upon the acousto-optic Bragg cell 672 preferably has a linear polarization oriented at 45° to the plane of the figure. An amplified oscillator 674 drives Bragg cell 672 to generate traveling acoustic waves of two frequencies $f_a$ and $f_b$. Acousto-optic Bragg cell 672 diffracts the light beam from light source 670 giving rise to a light beam 682 associated with the traveling acoustic wave of frequency $f_a$ and a light beam 684 associated with the traveling acoustic wave of frequency $f_b$. Light beams 682 and 684, which generally have the same polarization as input beam 671, differ in frequency by about the frequency difference $|f_a-f_b|$ and diverge at a small angle corresponding to the separation between the diffraction maxima. The electrical output of power amplifier 674 can be adjusted so that beams 684 and 682 carry approximately the same optical power. Source 670, acousto-optic Bragg cell 672, and oscillator 674 can thus form a source 680 of a divergent heterodyne beam.

Another optical system 676 converts the two frequency components having the same polarizations but different propagation directions into two parallel beams having orthogonal linear polarizations. In an exemplary embodiment, beams 684 and 682 after exiting Bragg cell 672 are incident on a birefringent prism 676 that is made of a crystal (e.g. quartz) with the optical axis parallel to the apex edge. An apex angle α of birefringent prism 676 satisfies Equation 1. In Equation 1, δ' is the angle separation between beams 684 and 682, $n_o$ and $n_e$ are the ordinary and extraordinary indices of refraction respectively, and θ is the exit angle of the output beam 678 relative to the normal from the output surface of prism 676. Birefringent prism 676 acts on intermediate beams 684 and 682 to split each into two orthogonally polarized beams, one parallel and one perpendicular to the plane of the figure, to produce two output beams 682A and 684A and two spurious beams 682B and 684B. Spurious beams 682B and 684B have directions of propagation different from the output beams 682A and 684A and can be eliminated by aperture 678, or by a conventional pinhole spatial filter arrangement. Light sources similar to beam source 12L are further described in U.S. Pat. No. 4,684,828, which is hereby incorporated by reference in its entirety.

$$\delta'=\sin^{-1}[n_o \sin \{\alpha-\sin^{-1}(\sin \theta/n_o)\}]-\sin^{-1}[n_e \sin \{\alpha-\sin^{-1}(\sin \theta/n_e)\}] \quad \text{Equation 1:}$$

Figure 16A:
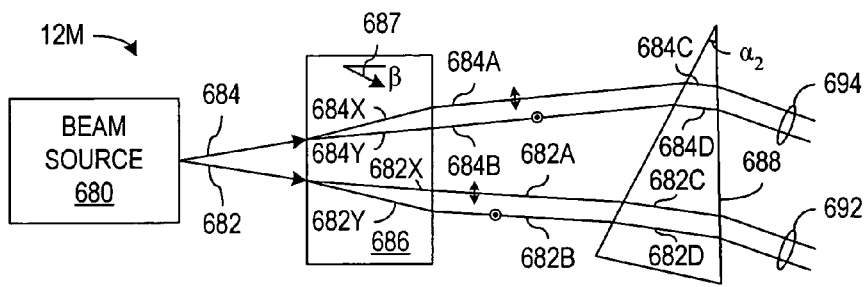
FIGS. 16A, 16B, and 16C illustrate beam sources that convert diverging beams having the same polarization into orthogonally-polarized beams.

FIG. 16A illustrates a beam source 12M including an alternative optical system for converting beams 682 and 684 that have the same polarization but different frequencies and different propagation directions into parallel beams 692 and 694. In this embodiment, beams 682 and 684 are incident on a phase retardation plate 686, typically made of a birefringent crystal. The directions of polarizations of incident beams 682 and 684 are substantially at 45° to the plane of the figure, and the optical axis 687 of phase retardation plate 686 is at an angle β with respect to a normal to the entrance face of phase retardation plate 686. Upon entering the plate 686, beam 684 splits into internal beam components 684Y and 684X, wherein internal beam components 684Y and 684X are ordinarily and extraordinarily polarized, respectively. Similarly, beam 682 forms internal beam components 682Y and 682X, wherein internal beam components 682Y and 682X are ordinarily and extraordinarily polarized. Since beam components 684 and 682 are incident on the retardation plate at different angles relative to the optic axis 687, extraordinarily polarized beam components 684X and 682X propagate within retardation plate 686 with phase velocities corresponding to different indices of refraction.

In general, Equation 2 indicates the index of refraction for an extraordinarily polarized beam propagating at an angle θ with respect to an optic axis of a birefringent crystal. In Equation 2, $n_o$ and $n_e$ are the ordinary and extraordinary principal indices of refraction of the birefringent crystal. The different indices of refraction for beam components 682X and 684Y can be determined from Equation 2. The index of refraction for ordinarily polarized beam components 682Y and 684Y is $n_o$. According to these indices of refraction, the optic axis 687 orientation and the thickness of retardation plate 686 are chosen such that retardation plate 686 introduces a phase shift of pπ radians in beam 682X relative to beam 682Y and a phase shift of (p+1) π radians in beam 684X relative to beam 684Y, p being an integer. Typically the angle β is set at a value substantially equal to 45°.

$$1/n^2 = \cos^2\theta/n_o^2 + \sin^2\theta/n_e^2 \quad \text{Equation 2:}$$

Beams 682X, 682Y, 684X, and 684Y exit phase retardation plate 686 as beams 682A, 682B, 684A, and 684B, respectively. As a consequence of the phase shifts introduced in beams 682X, 682Y, 684X, and 684Y, the polarization of portions of beams 682A and 682B that overlap one another is substantially at 45° to the plane of FIG. 16A and is substantially orthogonal to the polarization of portions of beams 684A and 684B that overlap one another, which is substantially 135° to the plane of FIG. 16A. The directions of propagation of beams 682A and 682B are parallel, and the directions of propagation of beams 684A and 684B are parallel because the entrance and exit faces of retardation plate 686 are substantially parallel.

There is a small lateral displacement $S_b$ between beams 682A and 682B and between beams 684A and 684B in FIG. 16A, the two lateral displacements being substantially the same. The lateral displacements are primarily a consequence of the difference in the direction of the respective energy flux vectors and the wave front vectors for extraordinarily polarized beams 682X and 684X in phase retardation plate 686. The lateral displacements between beams 682A and 682B and between beams 684A and 684B depicted in FIG. 16A are exaggerated for the purpose of clearly illustrating the effects. Typically, the lateral displacement $S_b$ is substantially smaller than the spot size of beam components 682A, 682B, 684A, and 684B.

Referring again to FIG. 16A, beams 682A, 682B, 684A, and 684B enter a birefringent prism 688 preferably made of a negative uniaxial crystal, e.g. $LiNbO_3$, or KDP. The optical axis of birefringent prism 688 is at an angle of 45° to the plane of FIG. 16A. Alternatively, for a birefringent prism 688 made of a positive uniaxial crystal, e.g. quartz or $TeO_2$, the optical axis of birefringent prism 688 is orientated at an angle of 135° to the plane of FIG. 16A.

Upon entering birefringent prism 688, each of beams 682A, 682B, 684A, and 684B separate into ordinarily-polarized beams (polarized at about 135°) and extraordinarily-polarized beams (polarized at about 45°). Because beams 682A and 682B substantially overlap one another and because retardation plate 686 introduces a phase difference between these two beams, the ordinarily polarized beams from beams 682A and 682B destructively interfere with one another, substantially canceling out each other. Thus, the ordinarily polarized beams from 682A and 682B are not shown in FIG. 16A. Conversely, the extraordinarily polarized beams from beams 682A and 682B constructively interfere with one another and emerge from prism 688 as beams 682C and 682D, respectively, which substantially overlap and have polarizations of 45°. Similarly, the extraordinarily polarized beams from beams 684A and 684B destructively interfere with one another, substantially canceling out each other. Thus, the extraordinarily polarized beams from beams 684A and 684B are not shown in FIG. 16A. The ordinarily polarized beams from beams 684A and 684B constructively interfere with one another and emerge from prism 688 as beams 684C and 684D, respectively, which substantially overlap and have polarizations of −45°.

The apex angle $\alpha_2$ of birefringent prism 688 is selected so that beams 682C and 682D exit birefringent prism 688 parallel to beams 684C and 684D. This is possible because beams 682C and 682D emerge from beams propagating as extraordinarily polarized beams in prism 688 and beams 684C and 684D emerge from beams propagating as ordinarily polarized beams in prism 688. As a result, if beams 682 and 684 have substantially equal intensities, the system produces a pair of substantially equal-intensity output beams, beam 692 (formed from the superposition of beams 682C and 682D) and beam 694 (formed from the superposition of beams 684C and 684D that propagate parallel to one another and have orthogonal polarizations (45° and −45°, respectively). There is a small non-zero lateral displacement between beams 682D and 684D, $S_a$. Typically, this displacement is less than about 100 microns. Beams 682C and 682D have the same frequency profile as the first input beam component 682 and beams 684C and 684D have the same frequency profile as the second input beam component 684, which is different from that of beams 682C and 682D if, for example, beams 682 and 684 emerge from an acousto-optic modulator within light source 680.

In some cases, such as when the lateral displacement $S_b$ is not negligible, the destructive interference between portions of beams 682A and 682B that propagate as ordinarily polarized beams within prism 688 is not complete. Similarly, the destructive interference between portions of beams 684A and 684B that propagate as extraordinarily polarized beams within prism 688 can also be incomplete. However, even in these cases, birefringent prism 688 ensures that beam 692 (which emerges from extraordinarily-polarized beams) has a polarization orthogonal to the polarization of beam 694 (which emerges from ordinarily-polarized beams). Portions of beams 682A and 682B that propagate as ordinarily polarized beams within prism 686 and do not completely cancel out because of destructive interference emerge as spurious beams, which diverge away from beams 692 and 694. Similarly, portions of beams 684A and 684B that propagate as extraordinarily polarized beams within prism 688 and do not completely cancel out because of destructive interference emerge as spurious beams, which also diverge away from beams 692 and 694. Because of the divergence, a spatial filter can be used to separate the spurious beams from output beams 692 and 694.

Many variations of the apparatus shown in FIG. 16A are possible. For example, a half-wave plate or quarter-wave plate can be placed between phase retarder 686 and birefringent prism 688 such that the output beams 694 and 692 are linearly and orthogonally polarized in directions other than 45° and −45° in the embodiment discussed above. The optical axis of birefringent prism 688 is then oriented at an angle of 90° to plane of FIG. 16A if the prism is made of a negative uniaxial crystal, or at 0° if the prism is made of positive uniaxial crystal. In another embodiment, a Wollaston prism can replace birefringent prism 688 and perform essentially the same function.

In another embodiment for FIG. 16A, a second birefringent prism (not shown) can reduce or substantially eliminate the lateral displacement between beams 682D and 684D. In particular, the second birefringent prism causes a compensating lateral displacement that depends on the apex angle of the second birefringent prism, and the apex angle of the second birefringent prism can be chosen to eliminate the original displacement.

Figure 16B:
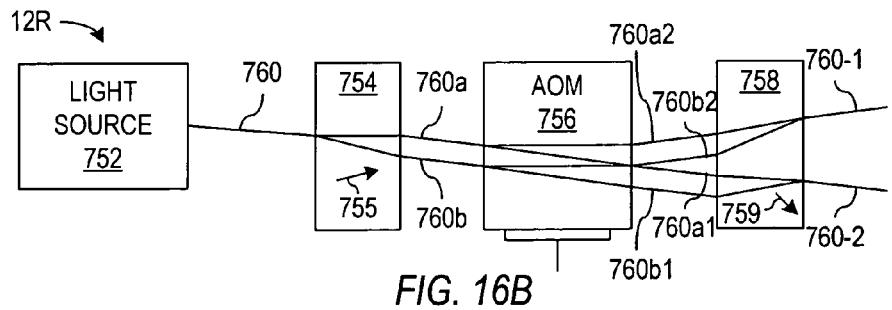

FIG. 16B illustrates another variant of the embodiment of FIG. 16A, which utilizes a beam source 12R such as described in U.S. Pat. No. 6,452,682. Beam source 12R includes two phase retardation plates 754 and 758 that are typically made of the same birefringent material. The optic axis 755 of the phase retardation plate 754 is orientated at an angle with respect to a normal to the entrance facet of phase retardation plate 754, orthogonal to a normal to the plane of FIG. 16B, and the angle between optical axis 755 of phase retardation plate 754 and optical axis 759 of phase retardation plate 758 typically is nominally 90°. In beam source 12R, a laser system 752 generates an input beam 760 having a linear polarization at 45° relative to the optical axis of a retardation plate 754. Upon propagating through retardation plate 754, input beam 760 separates into an extraordinarily-polarized beam 760a and an ordinarily-polarized beam 760b. Retardation plate 754 thereby introduces a lateral displacement or shift between beams 760a and 760b as a result of the difference between the directions of the energy flux vector and the wave front vector for the extraordinarily-polarized beam.

Beams 760a and 760b then propagate though an acousto-optic Bragg cell 756, which diffracts half of beams 760a and 760b into frequency-shifted beams 760a2 and 760b2. The undiffracted halves of beams 760a and 760b emerge from Bragg cell 756 as beams 760a1 and 760b1. Beams 706a1, 760a2, 760b1, and 760b2 enter a retardation plate 758. The thickness of phase retardation plate 758 is chosen to exactly compensate for the lateral displacement introduced by phase retardation plate 754. Thus, beams 760a1 and 760b1 completely overlap each other, forming a beam 760-1, and beams 760a2 and 762b2 completely overlap each other forming a beam 760-2 that differs in frequency and polarization from beam 760-1.

Figure 16C:
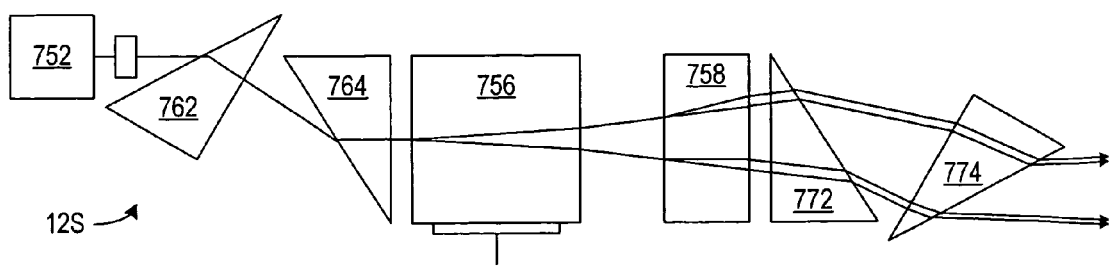

A similar method to compensate lateral displacement is shown in FIG. 16C utilizing another beam source 12S described in U.S. Pat. No. 6,452,682. Beam source 12S is similar to beam source 12R but uses prisms 762 and 764, typically non-birefringent, in place of retardation plate 754. Prisms 762 and 764 act as beam expanders in the plane of FIG. 16C before Bragg cell 756. Similarly, prisms 772 and 774 act as beam contractors in the plane of FIG. 16C after phase retardation plate 758. The net result is a reduction in the lateral displacement $S_b$ by a factor equal to the reduction factor of the beam contraction produced by prisms 772 and 774, the beam expansion factor of the beam expansion produced by prisms 762 and 764 being the reciprocal of the reduction factor of the beam contraction produced by prisms 772 and 774.

U.S. Pat. No. 6,452,682, which is hereby incorporated by reference in its entirety, further describes light sources using similar techniques for generation of suitable heterodyne beams.

Figure 17A:
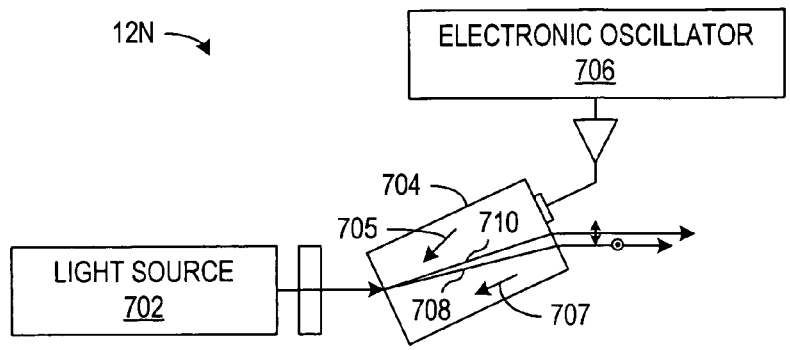
FIGS. 17A, 17B, 17C, 17D, and 17E illustrate beam sources employing diffracted and non-diffracted beams from acousto-optic crystals with alternative configurations.

Another type of beam source including an AOM uses both diffracted and non-diffracted beams. FIG. 17A, for example, illustrates a beam source 12N including a laser or other light source 702, an acousto-optic Bragg cell 704, and an oscillator 706. Beam source 12N converts a single stabilized frequency, linearly-polarized laser input beam from beam source 702 into an output beam having two collinear orthogonally-polarized components differing in frequency from each other by the frequency of a frequency stabilized electrical signal from electronic oscillator 706. In operation, oscillator 706 controls a power amplifier that drives a piezoelectric transducer affixed to acousto-optic Bragg cell 704. Bragg cell 704 is preferably made of a uniaxial crystal (e.g., quartz) having an optical axis 705 that makes an angle with the direction of propagation of the acoustic wave 707 generated by the piezoelectric transducer. The input beam from laser 702 enters Bragg cell 704, becoming an extraordinarily-polarized beam 710 traveling at an angle to the optical axis 705 of the crystal in Bragg cell 704. Additionally, the photoelastic interaction with the acoustic wave under conditions set forth in U.S. Pat. No. 4,687,958, which is hereby incorporated by reference in its entirety, causes Bragg diffraction that generates an ordinarily-polarized beam 708 having a shifted frequency.

Beams 708 and 710 exit acousto-optic Bragg cell 704 through a crystal face on which the piezoelectric transducer is fixed. Under this exit condition, output beams 708 and 710 are substantially parallel and spatially displaced, typically by only a small fraction of the beam diameter. Preferably, the electrical output of the power amplifier is adjusted so that exit beams 708 and 710 each have approximately the same intensity, which is approximately one-half that of input beam. Consequently, the output beam includes the two components 708 and 710, which are collinear, are orthogonally polarized, and differ in frequency.

Figure 17B:
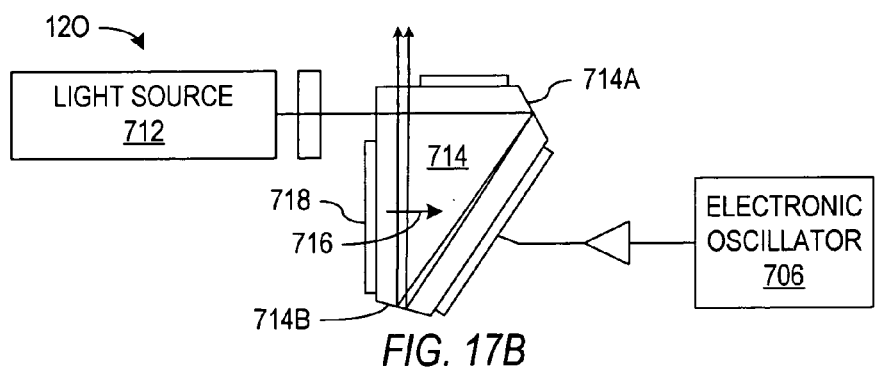
Figure 17C:
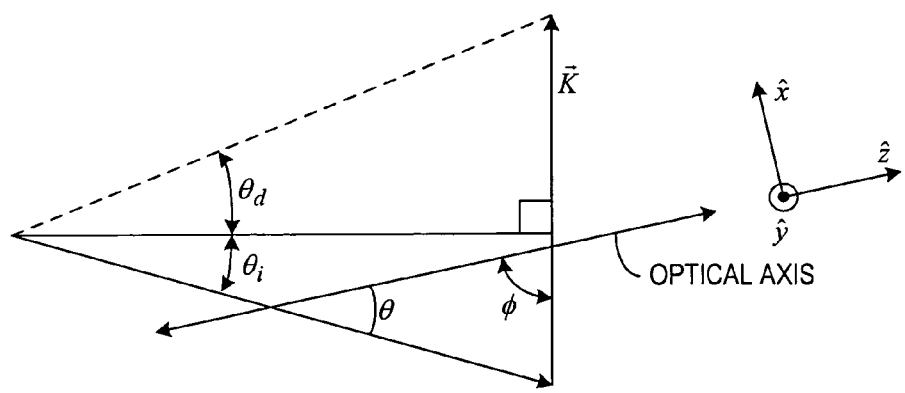

FIG. 17B shows an example of a beam source 12O containing an acousto-optic Bragg cell 714. Bragg cell 714 is preferably made of a uniaxial crystal having an optical axis in the plane of FIG. 17B, which makes a first angle with the direction of propagation of an acoustic wave 716 generated by piezoelectric transducer 718. The input beam enters Bragg cell 714, becoming an ordinarily-polarized beam that is reflected from surface 714 becoming an ordinarily-polarized beam at a second angle to the direction of propagation of acoustic wave 716. Due to the photoelastic interaction of this beam with the acoustic wave 716, Bragg diffraction generates an extraordinarily-polarized beam when the relationships of Equations 3 and 4 are satisfied. In Equations 3 and 4, $n_i$ and $n_d$ are the indices of refraction for the incident and diffracted beams, respectively; $\lambda_o$ is the optical wavelength in vacuum; v is the acoustic speed; and $f_o$ is the drive frequency of oscillator 706. The angles $\theta_i$ and $\theta_d$ are the angles between the incident and diffracted optical beams and the normal to the acoustic K-vector, respectively. FIG. 17C illustrates of positive angles $\theta_i$ and $\theta_d$.

$$\sin \theta_i = \lambda_o/(2n_i v)\{f_o + v^2(n_i^2 - n_d^2)/(f_o \lambda_o^2)\} \qquad \text{Equation 3:}$$

$$\sin \theta_d = \lambda_o/(2n_d v)\{f_o - v^2(n_i^2 - n_d^2)/(f_o \lambda_o^2)\} \qquad \text{Equation 4:}$$

Equation 2 above defines the index of refraction n for the extraordinarily polarized beam. The extraordinarily-polarized beam propagates at a small angle relative to the ordinarily-polarized beam, has a polarization orthogonal to that of the ordinarily-polarized beam, and has a frequency shifted by the diffraction from acoustic wave 716. A crystal face 714B reflects the two orthogonally-polarized beams. The respective angles of incidence and reflection or refraction for the beams at crystal faces 714A and 714B can be chosen such that beams exiting acousto-optic Bragg cell 714 are parallel and spatially displaced by only a small fraction of the beam diameter. For purposes of illustration, FIG. 17B exaggerates this displacement. Various modifications of FIG. 17B can be made to create a different nominal angle (e.g. 180° or 360°) between the input beams and output beams from the Bragg cell. It is intended that all combinations of elements and steps, which perform substantially the same function in substantially the same way to achieve the same result, are covered as part of this embodiment. Other beam paths and angles for the apex faces 714A and 714B of Bragg cell 714 are further described in U.S. Pat. Nos. 5,862,164 and 5,917,844, which are hereby incorporated by reference in its entirety.

Figure 17D:
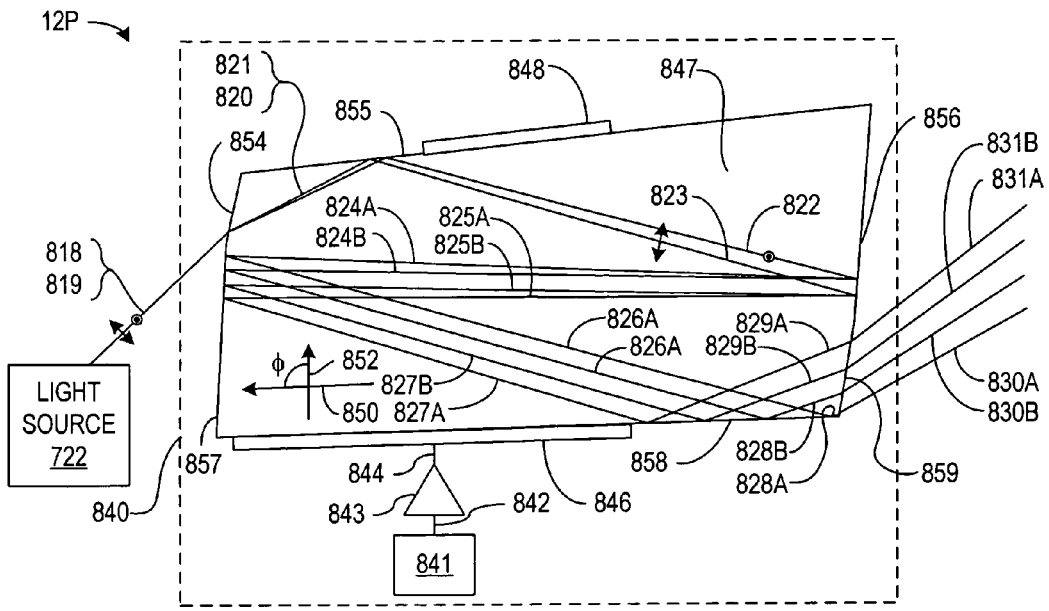

FIG. 17D illustrates a beam source 12P such as described in U.S. Pat. No. 5,970,077, which is hereby incorporated by reference in its entirety. In beam source 12P, a laser or other light source 722 directs an input beam into an acousto-optic crystal setup 840. The plane of polarization of beam from laser 722 can be rotated about the beam axis using techniques known to those skilled in the art, e.g., phase retardation plates, to form a beam including input beam components 818 and 819 having orthogonal linear polarizations. Input beam 818 is linearly polarized perpendicular to the plane of FIG. 17D, and input beam 819 is linearly polarized in the plane of FIG. 17D. Both beams 818 and 819 have the same frequency $f_L$. The relative intensities of beams 818 and 819 can be adjusted by control of the degree of rotation applied to the polarization of the beam from laser 722.

An electrical oscillator 841 preferably provides a frequency stabilized electrical signal 842 of frequency $f_o$ to a conventional power amplifier 843. An electrical output signal 844 of power amplifier 843 preferably drives a conventional piezoelectric transducer 846 affixed to a crystal 847, which is used to generate an acoustic beam, preferably of the shear wave type. Conventional techniques known to those skilled in the art of acousto-optical modulation are used to absorb in a preferred distribution the acoustic beam that passes through to the walls of acousto-optical crystal 847 for the purpose of substantially reducing temperature gradients in acousto-optical crystal 847. In particular, an absorber 848 can absorb the acoustic beam at the walls of acousto-optical crystal 847. The distribution of absorber 848 on the surface or surfaces of acousto-optical crystal 847 can be designed to permit absorber 848 to make the distribution of energy dissipation of the acoustic beam at the walls of acousto-optical crystal 847 correspond to a preferred distribution of absorption of the acoustic beam.

The presently preferred acousto-optical crystal 847 is made of a uniaxial crystal having an optical axis 850 that is in the plane of FIG. 17D and makes an angle $\phi$ with the direction of propagation of the acoustic wave 852 generated by piezoelectric transducer 846. FIG. 17D illustrates a configuration when acousto-optical crystal 847 contains a negative uniaxial crystal.

Figure 17E:
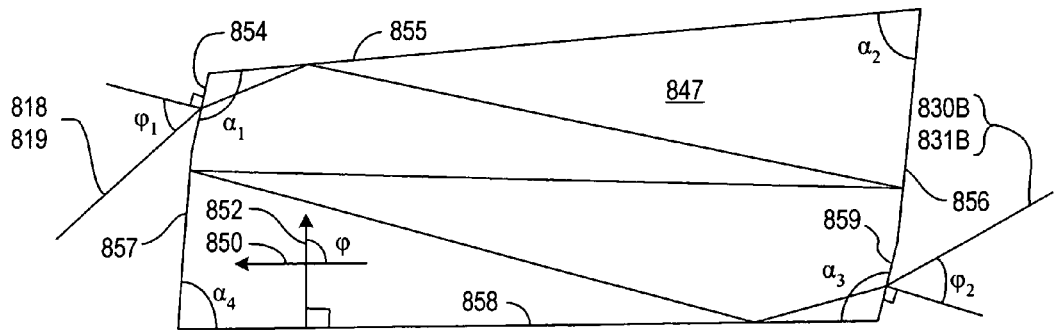

Input beam 818 preferably enters acousto-optical crystal 847 at a surface 854 with an angle of incidence $\phi_1$ (as shown in FIG. 17E), becoming an ordinarily polarized beam 820. Beam 820 reflects from a surface 855 becoming an ordinarily polarized beam 822. Beam 822 reflects from a surface 856 becoming ordinarily polarized incident beam 824A. Small angle Bragg diffraction resulting from the photoelastic interaction of incident beam 824A with the acoustic wave 852 generates an extraordinarily polarized beam, diffracted beam 824B when Equations 3 and 4 above are satisfied. Again, the definitions of angles are illustrated in FIG. 17C, and Equation 2 gives the index of refraction n for an extraordinarily polarized beam in a birefringent crystal.

Diffracted beam 824B propagates at a small angle to that of the non-diffracted incident beam 824A, the polarization of diffracted beam 824B being orthogonal to that of incident beam 824A. In addition, the frequency of beam 824B is $f_L-f_o$, while the frequency of beam 824A is $f_L$. Beams 824A and 824B reflect from a crystal face 857 becoming beams 826A and 826B, respectively. Beams 826A and 826B reflect from crystal face 858 as beams 828A and 828B, respectively, and beams 828A and 828B exit acousto-optical crystal 847 at crystal face 859 as beams 830A and 830B, respectively.

Input beam 819 preferably enters acousto-optical crystal 847 at surface 854 with an angle of incidence $\phi_1$, becoming an extraordinarily polarized beam 821. Beam 821 reflects from surface 855 becoming an extraordinarily polarized beam 823. Beam 823 reflects from surface 856 becoming extraordinarily polarized incident beam 825A. Due to the photoelastic interaction of incident beam 825A with acoustic wave 852, an ordinarily polarized, diffracted beam 825B is generated by small angle Bragg diffraction when the relationships given by Equations 3 and 4 are satisfied.

Diffracted beam 825B propagates at a small angle to that of non-diffracted incident beam 825A, the polarization of diffracted beam 825B being orthogonal to that of incident beam 825A. In addition, the frequency of beam 825B is $f_L+f_o$, while the frequency of beam 825A is $f_L$. Beams 825A and 825B reflect from crystal face 857 as beams 827A and 827B, respectively. Beams 827A and 827B reflect from crystal face 858 as beams 829A and 829B, respectively, and beams 829A and 829B exit acousto-optical crystal 847 at face 859 as beams 831A and 831B, respectively.

The respective angles of incidence and refraction for beams 818, 819, 820, and 821 at surface 854, the respective angles of incidence and reflection for beams 820, 821, 822, and 823 at surface 855, and the respective angles of incidence and reflection for beams 822, 823, 824A, and 825A at surface 856 are chosen such that the angle of deviation between beams 824B and 825B is $\epsilon-\delta$ where $\epsilon$ is a small angle, preferably $0 \leq \epsilon \leq \delta$, the angle of deviation between beams 824A and 824B is $\delta$, the angle of deviation between beams 825A and 825B is $-\delta$, and the angle of deviation between beams 824A and 825A is $\delta+\epsilon$, where $\delta$ is specified by Equation 5. In Equation 5, $\theta$ is the wavelength of the acoustic beam in acousto-optical crystal 847.

$$\sin \delta = \lambda_o/(n_i \Lambda) \cos \theta_d = \lambda_o/(n_d \Lambda) \cos \theta_i \quad \text{Equation 5:}$$

The above condition with respect to relative directions of propagation of beams 824A, 824B, 825A, and 825B can be obtained by choosing the apex angles $\alpha_1$ and $\alpha_2$ illustrated in FIG. 17E to satisfy Equation 6. In Equation 6, $n'_{1e}=n_{2e}$ are the indices of refraction for beam 821 at surfaces 854 and 855, respectively, $n'_{2e}=n_{3e}$ are the indices of refraction for beam 823 at surfaces 855 and 856, respectively, and $n'_{3e}$ is the index of refraction for beam 825A at surface 856.

$$\delta+\epsilon=\{\alpha_2-\alpha_1+\sin^{-1}(\sin \phi_1/n_o)\}-\sin^{-1}\{(n_{3e}/n'_{3e})\sin\{\alpha_2-\sin^{-1}\{(n_{2e}/n'_{2e})\sin[\alpha_1-\sin^{-1}\}\sin \phi_1/n'_{1e}]\}\} \quad \text{Equation 6:}$$

The respective angles of incidence and reflection for beams 824A, 824B, 825A, 825B, 826A, 826B, 827A, and 827B at surface 857, the respective angles of incidence and reflection for beams 826A, 826B, 827A, 827B, 828A, 828B, 829A, and 829B at surface 858, and the respective angles of incidence and refraction for beams 828A, 828B, 829A, 829B, 830A, 830B, 831A, and 831B at surface 859 are chosen such that beams 830B and 831B preferably are parallel. Beams 830B and 831B preferably are spatially displaced by a minute amount, i.e., a small fraction of the beam diameters, therein being substantially coextensive. The conditions with respect to the relative directions of propagation of beams 831B and 830B are obtained by choosing the apex angles satisfying Equation 7. In Equation 7, $\alpha_3$ and $\alpha_4$ are angles shown in FIG. 17E, $n'_{4e}=n_{5e}$ are the indices of refraction for beam 828B at surfaces 859 and 858, respectively, $n'_{5e}=n_{6e}$ are the indices of refraction for beam 826B at surfaces 858 and 857, respectively, and $n'_{6e}$ is the index of refraction for beam 824B at surface 857.

$$\delta-\epsilon=\{\alpha_4-\alpha_3+\sin^{-1}(\sin\phi_2/n_o)\}-\sin^{-1}\{(n_{6e}/n'_{6e})\sin\{\alpha_4-\sin^{-1}\{(n_{5e}/n'_{5e})\sin[\alpha_3-\sin^{-1}\{\sin\phi_2/n'_{4e}\}]\}\}\}$$ Equation 7:

When it is desired to have the beams 830B and 831B be not parallel, i.e., $\phi_2$ for beam 830B not the same as $\phi_2$ for beam 831B, then the values of the parameters of Equations 5 and 6 may be chosen so that beams 830B and 831B have a predetermined angle of divergence or convergence between them. In addition, when it is desired to have beams 818 and 819 be not parallel, i.e., $\phi_1$ for beam 818 not the same as $\phi_2$ for beam 819, then the values of parameters of Equations 5 and 6 may also be chosen so that beams 818 and 819 have a predetermined angle of divergence or convergence between them.

Preferably, the electrical output 844 of power amplifier 843 is adjusted so that intensity of principal output beam 830B relative to the intensity of the input beam 818 is some selected nominal value between 0% and 100%, preferably 100%. The ratio of the intensity of principal output beam 831B to the intensity of beam 819 is substantially the same as the ratio of the intensity of beam 830B to the intensity of beam 818. Further, beams 830B and 831B are orthogonally polarized and substantially coextensive. The frequencies of principal output beams 831B and 830B differ by $2f_0$ and differ from the frequency of beam 1016 by $\pm f_0$, respectively.

Spurious secondary output beams 830A and 831A are orthogonally polarized beams with frequencies the same as the frequency of beam 816. The directions of propagation of secondary output beams 830A and 831A deviate from the direction of propagation of principal output beams 830B and 831B by approximately $-n_o\epsilon$ and $n_o\epsilon$, respectively. The intensities of the secondary output beams 830A and 831A preferably have nominal values of 0% of the intensities of principal output beams 830B and 831B, respectively, as a consequence of the adjustment of electrical output 844 of the power amplifier 843 so that intensity of either principal output beam 830B relative to the intensity of input beam 818 or principal output beam 831B relative to the intensity of the input beam 819 preferably is the nominal value of 100%.

An important feature of the embodiment shown in FIG. 17D is an intrinsically low level of contamination of the output beams with non-shifted frequency components having directions of propagation substantially parallel with the direction of propagation of the principal output beams 830B and 831B. The low level of contamination in the system is a consequence of using non normal Bragg diffraction, Bragg diffraction in an uniaxial crystal, instead of normal Bragg diffraction and the absence of additional optical elements such as those made of birefringent crystals that would otherwise be required in the path of the output beams to make a pair of output beams parallel. The orientation of the polarization states of the principal output beams when using non-normal Bragg diffraction are determined by a plane and a normal to the plane, the plane being defined by the optical axis of the acousto-optical crystal 847 and the direction of propagation of the incident beams 824A and 825A in acousto-optical crystal 847. In a normal Bragg diffraction process, however, the orientation of the polarization state of the diffracted component of an output beam is the same as the polarization state of the progenitor incident beam. This feature of a normal Bragg diffraction process generally leads to a requirement for an additional birefringent optical element to follow the acousto-optical apparatus and render, if desired, the components of an output beam parallel. An additional birefringent optical element is a potential generator of output beam contamination, the output beam contamination arising from a misalignment of the additional birefringent optical element with respect to the acousto-optical apparatus.

Alternative embodiments to the system shown in FIG. 17D can include birefringent prisms used to change the relative directions of propagation of orthogonally polarized beams such as used in U.S. Pat. No. 5,970,077. The prisms may be independent components or be affixed to the Bragg cell or other optical components. Spatial filters may also be placed at the output to help discriminate against secondary beams.

Figure 18:
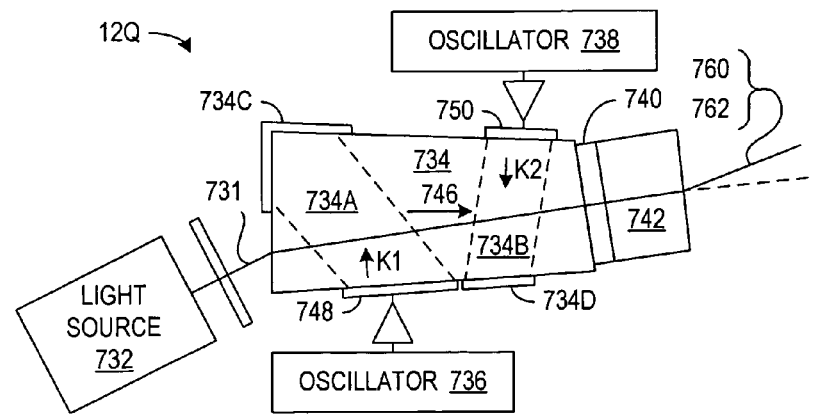
FIG. 18 illustrates a beam source using an acousto-optic crystal having separate interaction regions through which acoustic waves propagate.

FIG. 18 illustrates a beam source 12Q such as described in U.S. Pat. No. 6,157,660, which is hereby incorporated by reference in its entirety. Beam source 12Q includes a laser or other light source 732 that produces a linearly-polarized monochromatic beam perpendicular to the plane of the figure. This beam is directed into an acousto-optic crystal 734. In this embodiment, crystal 734 is made of an optically active uniaxial crystal having an optic axis 746 in the plane of FIG. 18 which makes an angle with a normal to the direction of wave front vector $K^{(1)}$ of the first acoustic wave generated by a piezoelectric transducer 748. The illustration shown in FIG. 18 is for an acousto-optical modulator cell comprised of a left-handed rotating positive uniaxial crystal, e.g., paratellurite. A first amplified oscillator 736 drives a first piezoelectric transducer affixed to acousto-optic crystal 734, and a second amplified oscillator 738 drives a second piezoelectric transducer affixed to acousto-optic crystal 734. The first and second acoustic waves are preferably of the shear wave type. The absorption of acoustic beams at the walls of acousto-optical modulator cell 734 is by absorbers 734C and 734D.

Referring to FIG. 18, light beam source 732 generates an input beam 731 that enters acousto-optical modulator cell 734, and exits the acousto-optical apparatus as output beams 760 and 762 and the series of secondary output beams. Output beams 760 and 762 are substantially linearly polarized.

A source of a first subset of the secondary output beams is the elliptically polarized eigenmodes for the propagation of light beams in acousto-optical modulator cell 734 comprising an optically active anisotropic crystal. The elliptical polarization of the eigenmodes of acousto-optical modulator cell 734 and the boundary conditions that must be satisfied by electric and magnetic fields of light beams being reflected and refracted at interfaces of optically active anisotropic crystals generate the first subset of the secondary output beams. These secondary output beams generally have reduced intensities in the apparatus. The first subset of the secondary beams have directions of propagation different from the directions of propagation of output beams 760 and 762 principally because of properties of birefringent truncated prisms 740 and 742.

Input beam 731 enters acousto-optical modulator cell 734 and, through an acousto-optical interaction with a first acoustic beam in the first interaction region 734A, is converted to an intermediate beam. The intensity of the intermediate beam is preferably substantially the same as the intensity of input beam 731. The intermediate beam subsequently passes through a second acoustic beam in the second interaction region 734B. By way of an acousto-optical interaction of the intermediate beam with the second acoustic beam, a portion of the intermediate beam is converted into a beam exiting acousto-optical apparatus as one of the output beams 760 and 762 with the remaining non-converted portion of the intermediate beam exiting acousto-optical apparatus as the other of the output beams 760 and 762.

Incomplete conversion of input beam 732 into the intermediate beam generates a second subset of the secondary output beams. The second subset of the secondary beams have reduced intensities in the apparatus and have directions of propagation different from the directions of propagation of output beams 760 and 762.

The net relative lateral displacements for beams 760 and 762 one with respect to the other, the displacements due to different directions of wave front vectors of internal optical beams in acousto-optical apparatus shown in FIG. 18 and to deviations of energy flux vectors from corresponding wave front vectors for optical beams propagating in a birefringent medium, are compensated for to a high level because of the design of compensating truncated prisms 740 and 742 shown in FIG. 18. The optic axes for prisms 740 and 742 are orthogonal to the plane of FIG. 18. The prisms 740 and 742 may be affixed to the acousto-optic crystal as shown, or may be used as separate, individual components.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A delivery method for a heterodyne beam comprising:
   generating a first beam of light with a first polarization and a first frequency and a second beam of light with a second polarization and a second frequency;
   directing the first beam and the second beam into a polarization state modulator (PSM) that is operable to change the polarizations of the first beam and the second beam in response to a control signal;
   coupling the first beam and the second beam into an optical fiber;
   generating a beat signal from the first beam and the second beam after the first beam and the second beam exit from the optical fiber; and
   using the beat signal in generation of the control signal for the PSM.

2. The method of claim 1, wherein coupling the first beam and the second beam into the optical fiber occurs after the first beam and the second beam exit from the PSM.

3. The method of claim 1, wherein directing the first beam and the second beam into the PSM occurs after the first beam and the second beam exit from the optical fiber.

4. The method of claim 1, wherein generating the beat signal comprises generating the beat signal in a first detector path that receives the first beam and the second beam after propagation through the optical fiber, and wherein the method further comprises:
   generating a second beat signal in a second detector path that receives the first beam and the second beam after propagation through the optical fiber;
   generating a third beat signal in a third detector path that receives the first beam and the second beam after propagation through the optical fiber; and
   generating a phase signal in response to the second and the third beat signals, wherein the controller uses the phase signal when generating the control signal.

5. The method of claim 1, wherein generating the first beam and the second beam comprises operating a laser.

6. The method of claim 5, wherein the laser comprises a Zeeman split-laser.

7. The method of claim 5, wherein directing the first beam and the second beam into the PSM comprises directing the first beam and the second beam through a birefringent plate between the laser and the PSM.

8. The method of claim 5, wherein the laser comprises a resonant cavity containing a birefringent element positioned such that the resonant cavity has a first optical path length for a first polarization of light and a second optical path length for a second polarization of light.

9. The method of claim 5, wherein the laser comprises a master laser that produces a first output beam, and generating the first beam and the second beam further comprises:
   operating a slave laser that produces a second output beam having a frequency that is adjustable in response to a second control signal; and
   measuring a frequency difference between the first output beam and the second output beam; and
   generating the control signal as required to set the second output beam at the frequency that provides a desired frequency difference.

10. The method of claim 5, wherein generating the first beam and the second beam further comprises operating an optical element that acts as a rotating half-wave plate through which a beam from the laser passes.

11. The method of claim 10, wherein the optical element comprises an electro-optic crystal, and operating the optical element comprises:
   applying a first alternating voltage across the electro-optic crystal in a first direction; and
   applying a second alternating voltage across the electro-optic crystal in a second direction.

12. The method of claim 11, wherein the first polarization of the first beam when entering the electro-optic crystal is a circular polarization, and the second polarization of the second beam when entering the electro-optic crystal is a circular polarization that is orthogonal to the first polarization.

13. The method of claim 10, wherein the laser is a Zeeman-split laser.

14. The method of claim 5, wherein generating the first beam and the second beam further comprises:
   splitting a beam from the laser with a polarizing beam splitter to produce a first polarization component and a second polarization component; and
   directing the first polarization component through a first acousto-optic modulator.

15. The method of claim 14, wherein generating the first beam and the second beam further comprises directing the second polarization component through a second acousto-optic modulator.

16. The method of claim 14, wherein the polarizing beam splitter is selected from a group consisting of a birefringent element and a film that is reflective for one of the first and second polarization components and transparent for the other of the first and second polarization components.

17. The method of claim 14, wherein the laser is a Zeeman-split laser.

18. The method of claim 5, wherein generating the first beam and the second beam further comprises operating an acousto-optic crystal in a path of an output beam from the laser, wherein at least one of the first beam and the second beam comprises light diffracted by an acoustic wave traversing the acousto-optic crystal.

19. The method of claim 18, wherein one of the first beam and the second beam comprises light not diffracted by the acoustic wave traversing the acousto-optic crystal.

20. The method of claim 18, wherein the acoustic wave comprises a first acoustic component and a second acoustic component, and a difference between the first frequency of the first beam and the second frequency of the second beam depends on a difference between a frequency of the first acoustic component and a frequency of the second acoustic component.

21. The method of claim 20, wherein the first acoustic component traverses a first portion of the acousto-optic crystal, and the second acoustic component traverses a second portion of the acousto-optic crystal that is separated from the first portion of the acousto-optic crystal.

22. The method of claim 18, wherein the acousto-optic crystal has an optical axis at a non-zero angle to a direction of propagation of the acoustic wave.

23. The method of claim 18, wherein the acoustic wave traverses an interaction region in the acousto-optic crystal, and the output beam from the laser is internally reflected within the acousto-optic crystal causing the output beam to traverse an interaction region more than once.

24. The method of claim 18, wherein generating the first beam and the second beam further comprises:

splitting the output beam from the laser into a first polarization component and a second polarization component that are both directed into the acousto-optic crystal;

combining portions of the first polarization component and the second polarization component that were diffracted by the acoustic wave in the acousto-optic crystal; and combining portions of the first polarization component and the second polarization component that were not diffracted by the acoustic wave in the acousto-optic crystal.

25. The method of claim 24, wherein a birefringent optical element is used to perform at least one of the splitting and/or combining steps.

* * * * *